(12) United States Patent
Li et al.

(10) Patent No.: US 11,526,286 B1
(45) Date of Patent: Dec. 13, 2022

(54) ADAPTIVE SNAPSHOT CHUNK SIZING FOR SNAPSHOTS OF BLOCK STORAGE VOLUMES

(71) Applicant: Amazon Technologies, Inc., Seattle, WA (US)

(72) Inventors: Xuan Li, Sammamish, WA (US); Marcin Piotr Kowalski, Cape Town (ZA); Anna Clara Nagy, Dover, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/362,773

(22) Filed: Jun. 29, 2021

(51) Int. Cl.
   *G06F 3/06* (2006.01)
(52) U.S. Cl.
   CPC .......... *G06F 3/0631* (2013.01); *G06F 3/0604* (2013.01); *G06F 3/0679* (2013.01)
(58) Field of Classification Search
   CPC ..... G06F 3/0631; G06F 3/0604; G06F 3/0679
   See application file for complete search history.

(56) References Cited

U.S. PATENT DOCUMENTS

| | | | |
|---|---|---|---|
| 5,434,994 | A | 7/1995 | Shaheen et al. |
| 5,574,878 | A | 11/1996 | Onodera et al. |
| 5,815,649 | A | 9/1998 | Utter et al. |
| 6,463,509 | B1 | 10/2002 | Teoman et al. |
| 7,788,664 | B1 | 8/2010 | Janakiraman et al. |
| 7,895,261 | B2 | 2/2011 | Jones et al. |
| 7,953,947 | B2 | 5/2011 | Akutsu et al. |
| 8,280,853 | B1 | 10/2012 | Lai et al. |

(Continued)

FOREIGN PATENT DOCUMENTS

| | | |
|---|---|---|
| WO | 2011/088261 | 7/2011 |
| WO | 2017028885 | 2/2017 |

OTHER PUBLICATIONS

"Amazon EBS API and Command Overview", downloaded Jul. 11, 2013 from doc.aws.amazon.com/AWSEC2/latest/UserGuide/ebs-api-cli-overview.html, p. 1.

(Continued)

*Primary Examiner* — Masud K Khan
(74) *Attorney, Agent, or Firm* — Alexander A. Knapp; Kowert, Hood, Munyon, Rankin & Goetzel, P.C.

(57) ABSTRACT

A storage manager implements adaptive snapshot chunk sizing, wherein snapshot chunks are sized differently based on an access pattern for volume data to be included in the respective snapshot chunks. For example, sequentially accessed sectors of a volume may be grouped into snapshot chunks of varying sizes and individually accessed sectors may be snapshotted as individual snapshot chunks. When a volume is populated from the snapshot chunks, the volume data is re-mapped into standard sized volume blocks. In some embodiments, an optimized manifest is generated indicting an order in which the snapshot chunks are to be used to populate a volume to perform a launch process using the volume. In some embodiments, adaptively sized snapshot chunks and a corresponding optimized manifest are used to accelerate performing a launch using a volume populated from a snapshot, such as launching an operating system, an application, a database, a machine image, etc.

20 Claims, 16 Drawing Sheets

(56) References Cited

U.S. PATENT DOCUMENTS

| | | | |
|---|---|---|---|
| 8,285,687 | B2 | 10/2012 | Voll et al. |
| 8,307,154 | B2 | 11/2012 | Stabrawa et al. |
| 8,321,642 | B1 | 11/2012 | Anzai et al. |
| 8,595,191 | B2 | 11/2013 | Prahlad et al. |
| 8,688,660 | B1 | 4/2014 | Sivasubramanian |
| 8,789,208 | B1 | 7/2014 | Sundaram et al. |
| 9,110,600 | B1 | 8/2015 | Brooker |
| 9,246,996 | B1 | 1/2016 | Brooker |
| 9,275,124 | B2 | 3/2016 | Sundaram et al. |
| 9,304,867 | B2 | 4/2016 | Sivasubramanian et al. |
| 9,405,483 | B1 | 8/2016 | Wei et al. |
| 9,503,517 | B1 | 11/2016 | Brooker |
| 9,563,385 | B1 * | 2/2017 | Kowalski ............. G06F 3/0665 |
| 9,792,060 | B2 | 10/2017 | Wei et al. |
| 9,886,213 | B2 | 2/2018 | Sivasubramanian et al. |
| 9,916,321 | B2 | 3/2018 | Sundaram et al. |
| 10,452,296 | B1 | 10/2019 | Greenwood et al. |
| 2002/0059253 | A1 | 5/2002 | Albazz et al. |
| 2003/0191930 | A1 | 10/2003 | Viljoen et al. |
| 2004/0078419 | A1 | 4/2004 | Ferrari et al. |
| 2006/0155946 | A1 | 7/2006 | Ji |
| 2008/0140905 | A1 | 6/2008 | Okuyama |
| 2009/0228889 | A1 | 9/2009 | Yoshida |
| 2009/0249470 | A1 | 10/2009 | Litvin et al. |
| 2010/0037009 | A1 | 2/2010 | Yano et al. |
| 2010/0070725 | A1 | 3/2010 | Prahlad et al. |
| 2010/0191922 | A1 | 7/2010 | Dickey et al. |
| 2010/0312983 | A1 | 12/2010 | Moon et al. |
| 2012/0079221 | A1 | 3/2012 | Sivasubramanian et al. |
| 2012/0254687 | A1 | 10/2012 | Leggette et al. |
| 2012/0290802 | A1 | 11/2012 | Wade et al. |
| 2013/0007389 | A1 | 1/2013 | Patterson et al. |
| 2013/0007753 | A1 | 1/2013 | Jain |
| 2013/0046966 | A1 | 2/2013 | Chu et al. |
| 2013/0086585 | A1 | 4/2013 | Huang et al. |
| 2013/0104126 | A1 | 4/2013 | Padmanabhuni et al. |
| 2013/0166831 | A1 | 6/2013 | Atkisson et al. |
| 2013/0198459 | A1 | 8/2013 | Joshi et al. |
| 2014/0181046 | A1 | 6/2014 | Pawar et al. |
| 2014/0330784 | A1 | 11/2014 | Sundaram et al. |
| 2014/0351636 | A1 | 11/2014 | Yin et al. |
| 2015/0370483 | A1 | 12/2015 | Schoebel-Theuer |
| 2016/0179839 | A1 | 6/2016 | Sundaram et al. |
| 2016/0216896 | A1 | 7/2016 | Sivasubramanian et al. |
| 2016/0328168 | A1 | 11/2016 | Wei et al. |
| 2017/0329528 | A1 | 11/2017 | Wei et al. |
| 2018/0173874 | A1 | 6/2018 | Muttik et al. |
| 2022/0164123 | A1 * | 5/2022 | Kim ...................... G06F 3/0604 |

OTHER PUBLICATIONS

"AMI Basics" downloaded Jul. 11, 2013 from doc.aws.amazon.com/AWSEC2/latest/UserGuide/ComponentsAMIs.html, p. 1-2.
"AWS Amazon Elastic Block Store (EBS)—Persistent Storage" downloaded Jul. 11, 2013 from aws.amazon.com/ebs/, pp. 1-4.
"Cloudiquity" Published Mar. 12, 2009, Amazon Web Services and Cloud, pp. 1-4.
"Feature Guide: Elastic Block Store: Articles & Tutorials: Amazon Web Services" downloaded Jul. 11, 2013 from aws.amazon.com/articles/1667, pp. 1-7.
VMware; Carl Waldspurger; Memory Resource Management in WMware ESX Server; pp. 1-24, Dec. 10, 2002.
HP; Chris Hyser et al.; Autonomic Virtual Machine Placement in the Data Center; pp. 1-10, Feb. 26, 2008; HP Laboratories.
SwinBrain. "Database Management System Introduction". Nov. 17, 2009. Also available at http://swinbrain.ict.swin.edu.au/wiki/Database_Management_Systems_Introduction.
Amazon S3 Storage Services Guide—Developer Guide (API Version Mar. 1, 2006 ). Can be accessed at <http://docs.aws.amazon.com/AmazonS3/latest/dev/Welcome.html>.
Reich et al. "VMTorrent: Scalable P2P Virtual Machine Streaming". Dec. 10-13, 2012 . . . .
U.S. Appl. No. 15/425,857, filed Feb. 6, 2017, Marcin Piotr Kowalski et al.
U.S. Appl. No. 12/892,742, filed Sep. 28, 2010, Swaminathan Sivasubramanian et al.
U.S. Appl. No. 12/892,735, filed Sep. 28, 2010, Swaminathan Sivasubramanian et al.
U.S. Appl. No. 14/205,067, filed Mar. 11, 2014, Danny Wei et al.
U.S. Appl. No. 14/204,992, filed Mar. 11, 2014, Danny Wei et al.
U.S. Appl. No. 14/625,535, filed Feb. 18, 2015, Surya Prakash Dhoolam et al.
U.S. Appl. No. 15/967,023, filed Apr. 4, 2018, Kiran-Kumar Muniswamy-Reddy.
U.S. Appl. No. 15/967,025, filed Apr. 30, 2018, Christopher Magee Greenwood.
U.S. Appl. No. 15/967,284, filed Apr. 30, 2018, Christopher Magee Greenwood.
U.S. Appl. No. 16/049,620, filed Jul. 30, 2018, Pavel Labovich.
International Search report and written Opinion from PCT/US2019/028320, dated Jul. 8, 2019, pp. 1-12.
U.S. Appl. No. 17/217,957, filed Mar. 30, 2021, Anil Gathala.
U.S. Appl. No. 15/917,165, filed Mar. 9, 2018, Arun Sundaram.
U.S. Appl. No. 15/934,608, filed Mar. 23, 2018, Christopher Magee Greenwood.
U.S. Appl. No. 17/006,502, filed Aug. 28, 2020, Sriram Venugopal.

* cited by examiner

*Optimized Manifest for Volume*
*(to be populated from snapshot)*
*190*

*1st – Populate Sector 156 Using Snapshot Chunk 182*

*2nd – Populate Sectors 162, 164, & 166 Using Snapshot Chunk 184*

*3rd – Populate Sector 158 Using Snapshot Chunk 186*

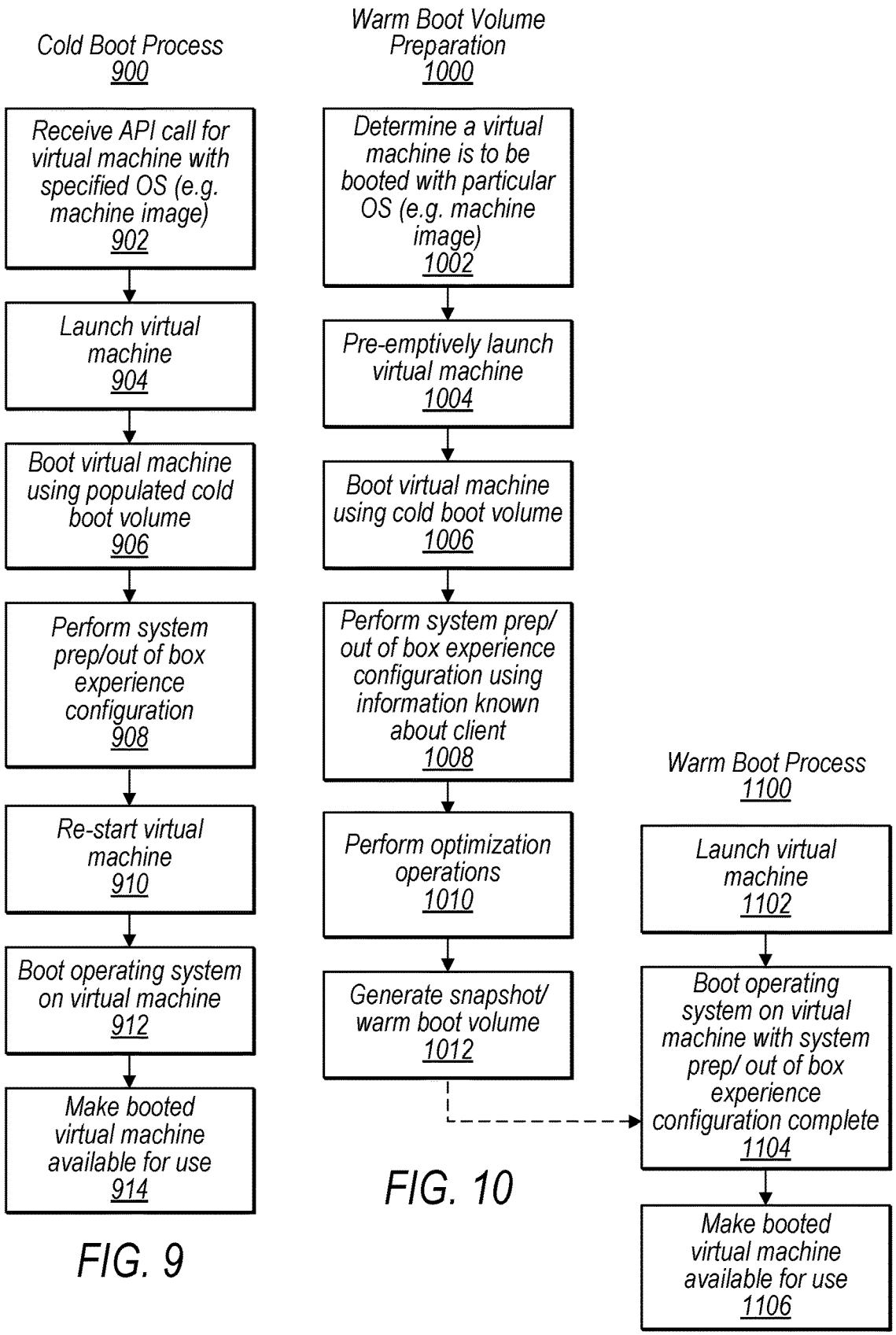

ADAPTIVE SNAPSHOT CHUNK SIZING FOR SNAPSHOTS OF BLOCK STORAGE VOLUMES

BACKGROUND

Advances in technologies for dynamically sharing virtualizations of hardware resources, software, and information storage across networks has increased the reliability, scalability, and cost efficiency of computing. More specifically, the ability to provide on demand virtual computing resources and storage through virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware.

Virtualized computing environments are frequently supported by block-based storage, object-based storage, database services, and/or other virtual storage services. In some situations, block-based storage resources may be able to interact with various computing virtualizations through a series of standardized storage calls that render the storage resources functionally agnostic to the structural and functional details of the block-based storage volumes that they support and the operating systems executing on the virtualizations to which they provide storage availability.

Some virtualized computing environments may store snapshots of block-based storage volumes, such as snapshots of a machine image, application, database, or boot volume for a virtualized computing resource.

BRIEF DESCRIPTION OF THE DRAWINGS

FIG. 1C illustrates an example optimized manifest that may be generated by performing one or more optimization operations to optimize a snapshot of a volume, according to some embodiments.

FIG. 9 is a flow diagram illustrating a process for booting a machine instance using a cold boot volume, according to some embodiments.

FIG. 10 is a flow diagram illustrating a process for generating a warm boot volume, according to some embodiments.

FIG. 11 is a flow diagram illustrating a process for booting a machine instance using a warm boot volume, according to some embodiments.

Figure 1A:
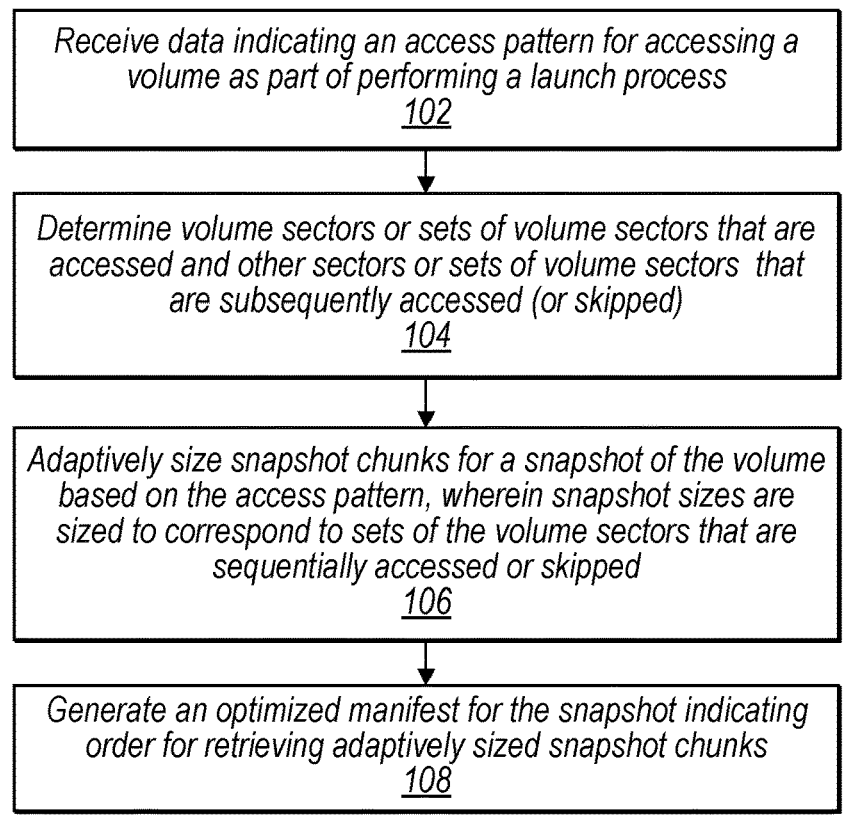
FIG. 1A illustrates a process of generating a snapshot comprising adaptively sized snapshot chunks, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein implement adaptive snapshot chunk sizing, wherein different snapshot chunks of a given block-based volume are sized differently (e.g. the snapshot chunks are not required to conform to a single standardized snapshot chunk size). In some embodiments, the snapshot chunks may be adaptively sized to corresponds to portions of a block-based volume that are accessed sequentially or in close proximity during a launch process, such as when launching an operating system, an application, a database, etc. In some embodiments, the snapshot chunks may be adaptively sized to correspond to portions of a block-based volume that are unique when used to store launch volume information for a particular application, database, machine instance, etc. or the snapshot chunks may be adaptively sized to correspond to other portions of the block-based volume that store launch volume information that is commonly used to launch the application, the database, the machine instance, generally (e.g. launch volume information that is not unique to a particular client or implementation).

In some embodiments, a launch volume that is repeatedly used to perform a launch process may be optimized by adaptively sizing snapshot chunks and/or generating an optimized manifest for use in performing a launch process using a snapshot of the launch volume. For example, an access pattern for the launch volume may be analyzed to determine volume sectors that are sequentially accessed or accessed in close proximity to one another. These volume sectors may be grouped together and form the basis for adaptively sized snapshot chunks, wherein the adaptively sized snapshot chunks comprise volume sectors of the launch volume that are accessed sequentially or in close proximity. As an example, and for simplicity of explanation, say that a volume includes sectors 1 through 10, wherein an access pattern indicates that sectors 2-4 are accessed sequentially or in close proximity to one another in the launch process, then sector 1 is accessed, then sector 5 is accessed, then sectors 7-8 are accessed. Based on such an access pattern, a storage manager may group sectors 2-4 into a first larger adaptively sized snapshot chunk, include sector 1 by itself in a smaller adaptively sized snapshot chunk, include sector 5 by itself in another smaller adaptively sized snapshot chunk, and group sectors 7-8 in a medium sized adaptively sized snapshot chunk. Also, the storage manager may generate an optimized manifest indicating that the larger adaptively sized snapshot chunk comprising volume information for sectors 2-4 is to be retrieved first, the smaller adaptively sized snapshot chunk comprising volume information for sector 1 is to be retrieved second, the smaller adaptively sized snapshot chunk comprising volume information for sector 5 is to be retrieved third, and the medium sized adaptively sized snapshot chunk comprising volume information for sectors 7-8 is to be retrieved fourth. In this way, an application, operating system, database, etc. may be more quickly launched using the launch volume because the launch volume is being populated with adaptively sized snapshot chunks that are sized to match sectors of the volume that are needed to perform the launch process and are being retrieved in the order in which the sectors are needed in the launch process.

In some embodiments, a snapshot of a block-based volume stored using adaptively sized snapshot chunks may be a snapshot of a launch volume or machine image used to boot a compute instance, such as a virtual machine, bare metal machine instance, etc., or the launch volume may be used to launch an application, database, etc. within an already launched machine instance. Some portions of the launch volume may include launch volume information that is generally usable by machine instances for launching an operating system, application, database, etc., while other portions of the launch volume may comprise launch volume information that is specific to a particular machine instance or specific to a particular client. For example client specific configurations may be included in the specific launch volume information, whereas general operating system information, application information, database information, etc. may be included in the common launch volume information. In such circumstances, the common launch volume information may make up a larger portion of the launch volume, while the machine instance or client specific launch volume information may make up a smaller portion of the launch volume. In such circumstances, snapshot chunks for the common launch volume information may be sized to have a larger size while snapshot chunks for the client/machine instance specific launch volume information may be sized to have a smaller snapshot chunk size. In some embodiments, snapshot chunks may be sized independently of volume block sizes. For example, in some embodiments, volume blocks may be configured using a standard size, such as 4 KB, whereas snapshot chunks may range in size, for example between 4 KB and 512 KB.

Continuing the example, instead of combining client or machine instance specific launch volume information (e.g. unique launch volume information) and common launch volume information (e.g. non-unique launch volume information) into a single standard sized snapshot chunk, the unique launch volume information may be included in a separate smaller snapshot chunk adaptively sized to correspond to the size of the unique launch volume information. Additionally, in some embodiments, the common launch volume information may be stored in one or more larger snapshot chunks that are stored in a cache that is proximately located in a provider network to a block-based storage service that uses the snapshot chunks to populate launch volumes. In this way, booting a machine instance using a launch-volume of the block-based storage service populated with launch volume information may be accelerated by retrieving larger snapshot chunks comprising common launch volume information from a proximately located cache, and also retrieving smaller client or machine instance specific snapshot chunks from another storage service, such as an object-based storage service of the provider network. In a similar manner, launching of an application database, etc. may be accelerated using adaptively sized snapshot chunks. By using smaller sized snapshot chunks for the unique launch volume information, retrieval of the client specific or machine instance specific launch volume information is simplified and made more efficient. Also, by using larger sized snapshot chunks for the common launch volume information, retrieval of the common launch volume information is more efficient. In this way, the process of populating a launch volume from snapshot chunks is shortened by only having to retrieve unique launch volume information from a non-cache source. Also, the limited storage space of the cache is efficiently used by primarily storing commonly used portions of the launch volume in the cache.

In some embodiments, adaptively sized snapshot chunks may be optimally sized based on common and unique volume information types and access sequences, or in some embodiments, adaptively sized snapshot chunks may be optimized sized based on access sequences, volume information type, or other parameters.

In some embodiments, a provider network and/or a storage service of the provider network comprises a warm boot service. In some embodiments, a warm boot service anticipates that a machine instance is to be booted using a particular launch volume (e.g. machine instance). In such a case, the warm boot service pre-emptively boots another virtual machine using a cold boot volume comprising an operating system that is anticipated to be used by the compute instance that the warm boot service forecasts is going to be requested/booted. The warm boot service further uses information known about the client to configure the operating system on the pre-emptively booted virtual machine. Additionally, the warm boot service generates a snapshot of the configured pre-emptively booted virtual machine operating system and stores the snapshot as a warm boot volume. The warm boot volume snapshot may be stored via multiple snapshot chunks having different sizes, wherein parts of the warm boot volume that are common and not specific to the particular client are included in snapshot chunks stored in a cache (or are already stored in the cache) and other parts of the warm boot volume that are specific to the particular client are stored as snapshot chunks in another storage service, such as an object based-storage service. Additionally or alternatively, the snapshot chunks of the warm boot volume snapshot may be sized based on an access pattern in which sectors of the warm boot volume are accessed when booting a machine instance using the warm boot volume.

When the anticipated machine instance is actually requested, the block-based storage service may populate a warm boot volume for the machine instance using the common snapshot chunks stored in the cache and the client specific snapshot chunks stored in the other storage service. The machine instance may then be booted using the populated warm boot volume, wherein the operating system of the machine instance is booted with the client specific configurations already applied via the warm boot volume.

In some embodiments, distributed systems of a provider network may host various resource instances, such as compute resource instance and storage resource instances, for performing or implementing different systems, services, applications and/or functions, such as a block-based storage service, a virtualized computing service, a cache storage service, a block-based storage service, etc. Resource instances may be of many different types and may be hosted at one or more resource hosts of a distributed system, such as one of various types of physical or virtualized computing resources, storage resources, or networking resources.

In at least some provider networks, a network-accessible virtual compute service may be established, enabling clients to utilize virtualized compute servers (which may also be referred to as "compute instances" herein) set up on their behalf at resource hosts managed by the provider network operator. In some embodiments, "compute instances" may also be offered as bare metal instances that are not shared with other customers. A given resource host may implement, at a given point in time, one or more compute instances, as well as a virtualization management software stack (e.g., a hypervisor and/or one or more administrative operating system instances). In some embodiments a virtual compute service may include a set of resource hosts configured to implement compute instances for customers of the virtual compute service. In some embodiments, a block-based storage service may provide virtual storage volumes to compute instances of a virtualized computing service of the provider network.

According to some embodiments, a block-based storage service of the provider network may enable clients to create or instantiate virtual block storage devices, such as mountable block-level storage volumes or launch volumes. The virtual block storage devices may implement block device programmatic interfaces for I/O, and may enable one or more storage volumes or launch volumes to be programmatically attached to a compute instance to support networked block-level I/O operations (as opposed to, for example, file-level I/O operations) from the compute instance. In some embodiments, for example, a block-based storage service may expose a "CreateVolume" application programmatic interface (API), enabling clients to specify a volume size, as well as various other parameters such as a provisioned performance level to be supported by the block-based storage service (expressed in units such as block I/O operations per second) for a requested volume. Also, a virtual compute service or block-based storage service, may provide an API allowing a customer to select an operating system or other machine image to be used to populate a requested volume, such as a launch volume. An "AttachVolume" API may be supported in such an embodiment to programmatically attach a specified volume to a specified compute instance of the virtual compute service. After a given volume implemented by the block-based storage service is attached to a compute instance, in some embodiments, the compute instance may interact with the volume just as it would interact with a local drive, e.g., formatting the volume with a file system and/or installing applications on the volume.

In some embodiments, a virtual compute service may automatically cause a launch volume to be created, populated, and attached to a virtual compute instance in response to a client or customer requesting a compute instance implemented using a specified operating system or machine image. Also, in some embodiments, a launch volume may be attached to a compute instance in order to launch an application, database, etc.

The volumes provided by the block storage service may behave analogously to raw unformatted external hard drives from the perspective of the compute instances. Note that due to such flexibility, in some circumstances different compute instances may format different volumes provided by a block-based storage service with different file systems, for example based on user preferences and objectives.

In some embodiments, clients of a block-based storage service may be able to generate point-in-time snapshots of their volumes programmatically, e.g., using a "CreateSnapshot" API. The point-in-time snapshot may be stored within a different storage service of the provider network in at least some embodiments, such as a storage repository service that exposes a web-services interface rather than a block device interface. In some embodiments, the storage repository service may be an object-based storage service as opposed to a block-based storage service. In some embodiments, the created snapshots may be stored in part in a cache storage service and stored in part in the storage service repository, such as the object-based storage service. Additionally, in some embodiments, a snapshot may be fully stored in the cache or fully stored in the object-based storage service.

In at least some embodiments, a repository storage service that stores snapshot chunks may be configured to store key-value objects, e.g. the repository storage service may be an object-based storage service where each object is simply considered as an unstructured collection of bits identified by a key. As opposed to the block device interfaces implemented by the block-based storage service, in at least some embodiments the repository service may implement a web services API, so that, for example, clients of the repository service may store data directly to, and access data directly from, the repository service without being required to attach or mount any devices, and without necessarily using compute instances of the provider network. In various embodiments, the provider network may support high data durability levels, for either the block-based storage service, the storage repository, or both. Various types of data replication techniques, such as full replication or erasure coding algorithms, may be used to ensure the desired data durability in different embodiments. Note that the snapshot objects stored in the storage repository may be referred to herein as a "snapshot archive."

In at least some embodiments, a cache storage service may be located proximate to resource hosts of a compute service and/or block-based storage service and may be configured to store snapshot chunks formatted as key-value objects. In some embodiments, a cache may be implemented on a same set of resource hosts that implement compute instances to which a block-based volume is attached.

In some embodiments, a new volume may be created using an existing point-in-time snapshot as a data source for the volume. For example, a "CreateVolume" call may specify a source snapshot. In some embodiments, a volume populated with data from an existing snapshot may be attached to a desired compute instance, thus setting the state of the compute instance attached to the volume to a point in time at which the snapshot was generated. In some embodiments, a same snapshot, such as a machine image, may be used to create volumes for a plurality of compute instances. A number of other APIs to manage volumes and snapshots may be supported by a block-based storage service in various embodiments, such as DetachVolume, DeleteVolume, DescribeVolumes (to obtain configuration information regarding a specified set of volumes), DeleteSnapshot, CopySnapshot, UpdateSnaphsot, and so on. It is noted that in at least in some embodiments, a given snapshot used as a source for a volume may not necessarily represent a single point in time (i.e., not all snapshots need be point-in-time snapshots, but may instead be a commonly used machine image).

In some embodiments, a provider network includes a plurality of resource hosts configured to implement a block-based storage service, such as storage servers, a plurality of resource hosts configured to implement a cache storage service for the block-based storage service, and one or more resource hosts configured to implement an object-based storage service, such as additional storage devices, storage servers, etc. The cache storage service and the object-based storage service are configured to store snapshot chunks for use in populating a volume of the block-based storage service.

In some embodiments, a storage service of the provider network includes a block mapper that re-maps retrieved snapshot chunks into file system-level blocks. For example, in some embodiments, snapshot chunks may be configured with different sizes (e.g. include more or fewer bytes), which may be different than a file-system level block size. Thus, it may be necessary to re-map the retrieved snapshot chunks into file-system level blocks. As an example, file system data storage blocks may be 4 KB blocks, whereas snapshot chunks may range in size from 4 KB chunks to 512 KB chunks. Thus, the snapshot chunks must be re-mapped in order for the file system driver to be able to access the correct pieces of data by issuing a call to a particular offset of a particular file system-level block (that has been re-mapped).

In some embodiments, snapshot chunks that are re-mapped to file-system level blocks may appear as virtual hard disks, and a kernel of an OS may use file system interpretation primitives to directly access files from the re-mapped snapshot chunks (e.g. re-mapped to file-system level blocks).

As referred to herein, a set includes a group of one or more constituent components. For example, a set of resource hosts may include a group comprising one resource host, or a group comprising multiple resource hosts.

Figure 1B:
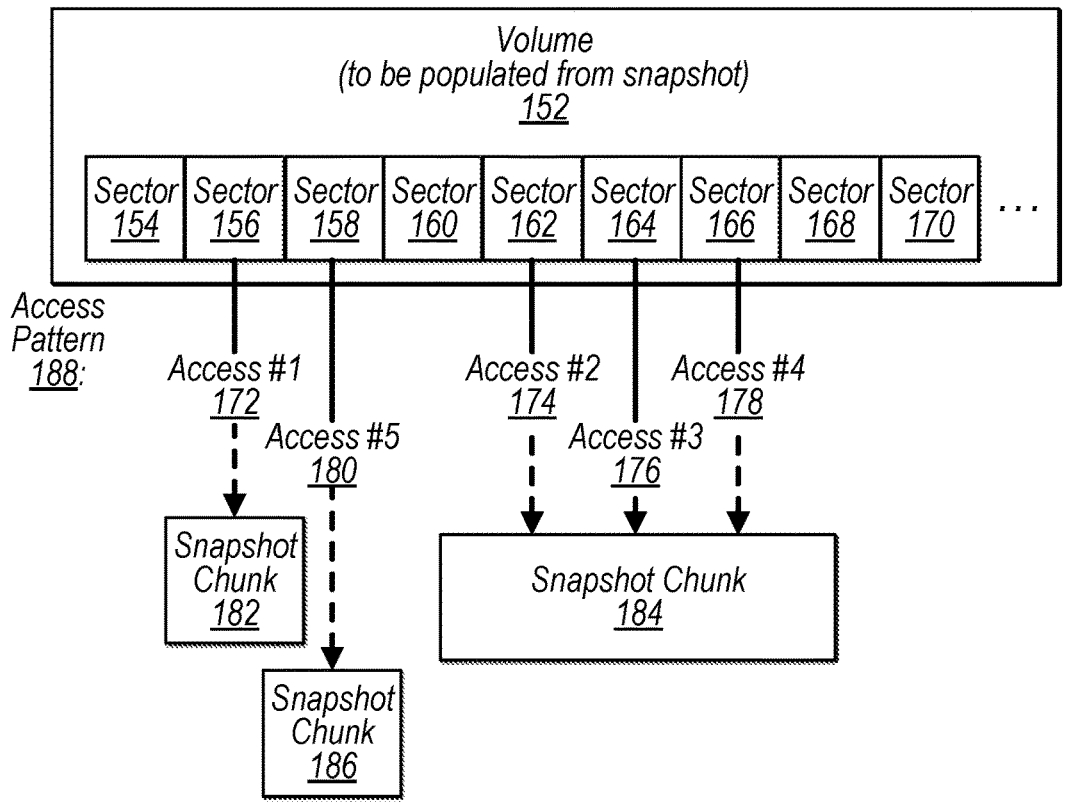
FIG. 1B illustrates an example access pattern of a volume that may be used by a storage manager to perform one or more optimization operations for a snapshot of the volume, such as adaptively sizing snapshot chunks of the snapshot, according to some embodiments.

FIG. 1A illustrates a process of generating a snapshot comprising adaptively sized snapshot chunks, according to some embodiments. FIG. 1B illustrates an example access pattern of a volume that may be used by a storage manager to perform one or more optimization operations for a snapshot of the volume, such as adaptively sizing snapshot chunks of the snapshot, according to some embodiments. FIG. 1C illustrates an example optimized manifest that may be generated by performing one or more optimization operations to optimize a snapshot of a volume, according to some embodiments.

At block 102, data indicating an access pattern for accessing a volume as part of a launch process, such as access pattern 188, is received. For example, access pattern 188 indicates that volume 152 is first accessed (172) at sector 156, then is accessed (174, 176, 178) at sectors 162, 164, and 166. Next volume 152 is accessed (180) at sector 158.

At block 104, volume sectors or sets of volume sectors of a launch volume that are accessed (and subsequently accessed) in a launch process are determined and at block 106, snapshot chunks are adaptively sized based on the access pattern, wherein snapshot sizes are sized to correspond to sets of the volume sectors that are sequentially or proximately accessed or skipped. For example snapshot chunk 182 is adaptively sized to correspond to a size of sector 156, snapshot chunk 186 is adaptively sized to correspond to a size of sector 158 (without including sector 160). Snapshot chunk 184 is adaptively sized to correspond to sectors 162, 164, and 166 that are sequentially accessed (without including sectors 160, 168, and 170 that are skipped and/or accessed later in the launch sequence).

At block 108, an optimized manifest, such as manifest 190 illustrated in FIG. 1C is generated for an optimized snapshot of the launch volume comprising the snapshot chunks adaptively sized based on the access pattern. As can be seen in FIG. 1C, the optimized manifest 190 indicates an order in which the adaptively sized snapshot chunks are to be retrieved in order to populate the launch volume in a manner that is optimized for use in performing a launch process indicated in the access pattern 188.

Figure 2:
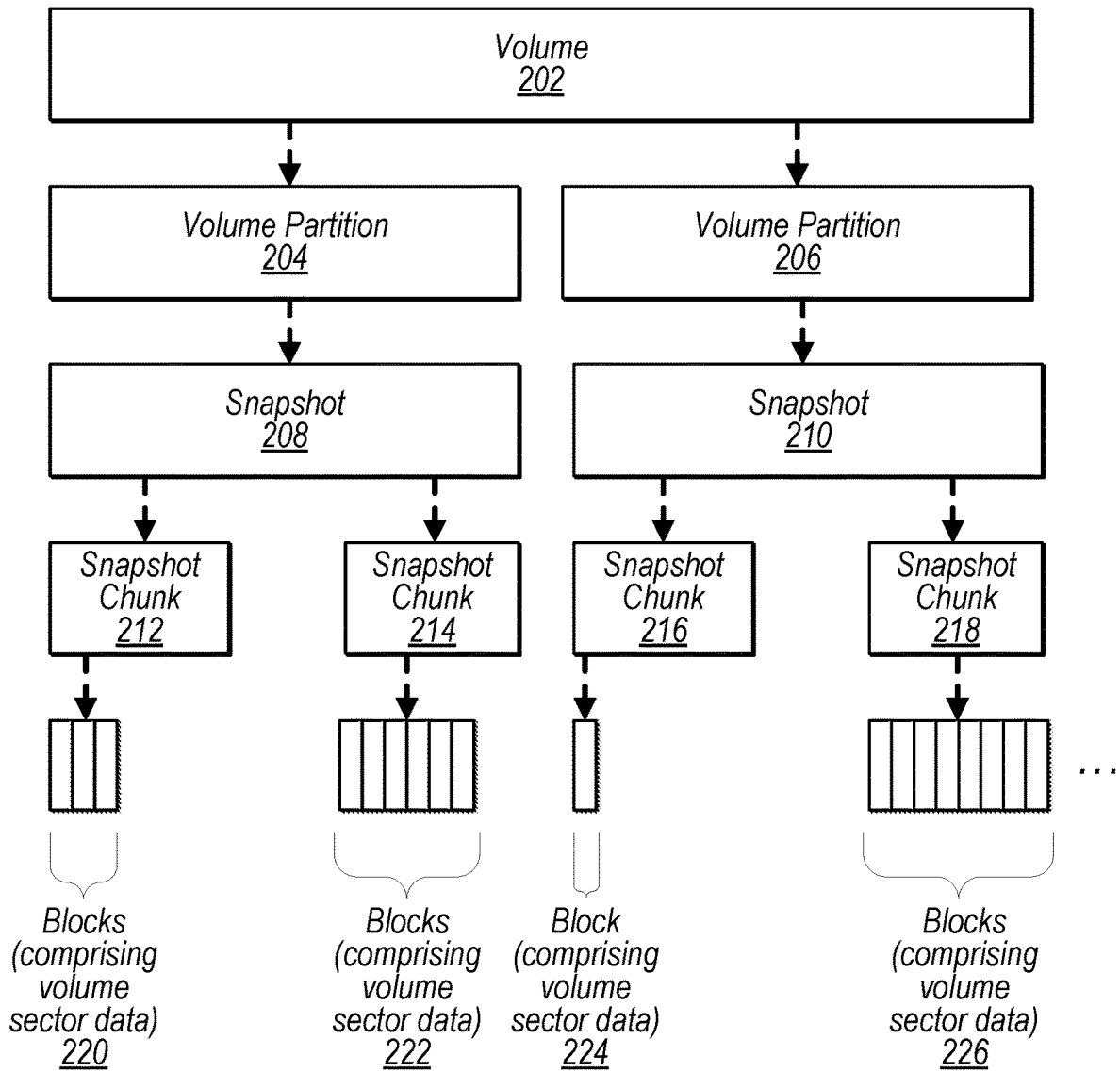
FIG. 2 illustrates example relationships between a volume, a volume partition, a snapshot, a snapshot chunk, and a volume block or disk sector, according to some embodiments.

FIG. 2 illustrates example relationships between a volume, a volume partition, a snapshot, a snapshot chunk, and a volume block or disk sector, according to some embodiments.

In some embodiments, a volume, such as volume 202, may be partitioned into two or more partitions, such as partitions 204 and 206 (though some smaller volumes may not be partitioned). A snapshot may be generated for each volume or volume partition, such as snapshots 208 and 210. Each snapshot may be made up of one or more snapshot chunks, such as snapshot chunks 212 and 214 or snapshot chunks 216 and 218. In some embodiments, some snapshot chunks may be sized according to a standard size, such as 512 KB, while other snapshot chunks may be adaptively sized to correspond to one or more volume sectors (e.g. 4 KB blocks). For example, snapshot chunk 212 is sized to correspond to 3 blocks/sectors (220), snapshot chunk 214 is sized to correspond to 6 blocks/sectors (222), snapshot chunk 216 is sized to correspond to a single block/sector 224, and snapshot chunk 218 may be a standard sized snapshot chunk, comprising more blocks/sectors than snapshot chunks 212, 214, or 216.

Figure 3:
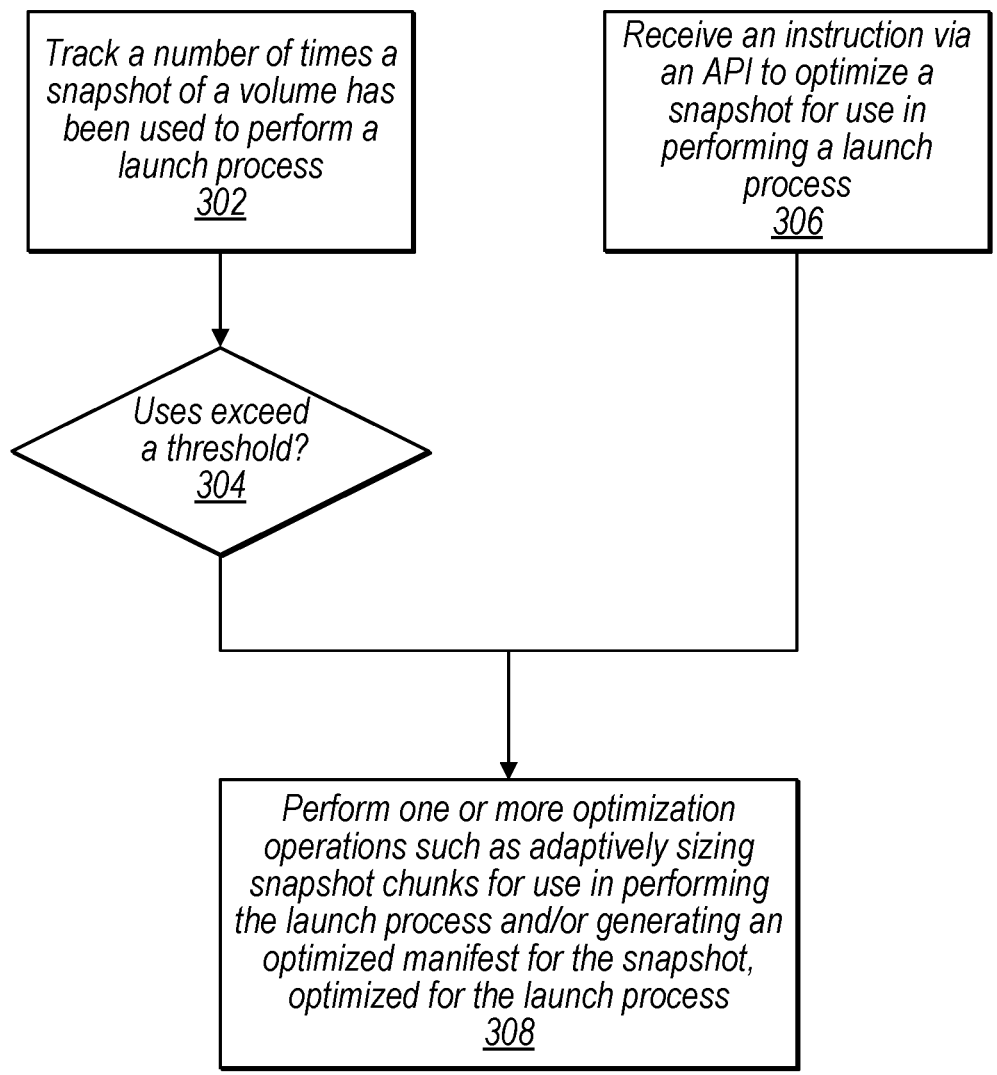
FIG. 3 illustrates example processes for initiating optimization of a snapshot, according to some embodiments.

FIG. 3 illustrates example processes for initiating optimization of a snapshot, according to some embodiments.

In some embodiments, a storage manager may be configured to automatically optimize a snapshot for a launch volume in response to detecting the snapshot for the launch volume is repeatedly being used, for example to launch an operating system, application, database, etc. Also, in some embodiments, a block-based storage service and/or the storage manager may implement an application programmatic interface (API) that enables a customer or client to request a snapshot for a given volume be optimized for launch.

For example, at block 302, the storage manager, such as storage manager 530 (further described in FIGS. 5A-6B), may track a number of times a snapshot of a volume has been used to perform a launch process. At 304, if the number of times exceeds a repetition threshold, such as 5 repeated uses (or another selected threshold), the storage manager may perform (at block 308) one or more optimization operations such as adaptively sizing snapshot chunks for use in performing the launch process and/or generating an optimized manifest for the snapshot, optimized for the launch process. For example the storage manager may perform a process as shown in FIG. 1A. Additionally, or alternatively, at block 306, an instruction may be received via an API requesting that a given snapshot be optimized for use in performing a launch process. In response to receiving the instruction/request, the storage manager may perform the one or more optimizations at 308.

Figure 4:
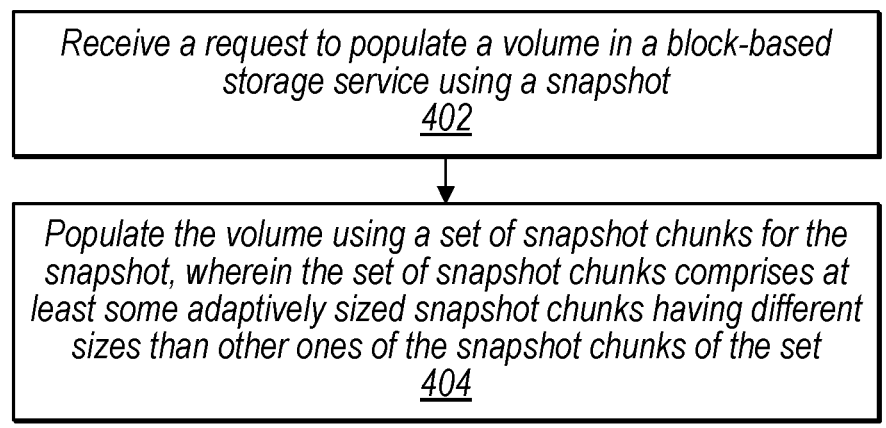
FIG. 4 illustrates an example process for populating a volume using an optimized snapshot, according to some embodiments.

FIG. 4 illustrates an example process for populating a volume using an optimized snapshot, according to some embodiments.

At block 402, a request to populate a volume, such as a launch volume, in a block-based storage service using an optimized snapshot is received. At block 404, the volume is populated using a set of snapshot chunks for the snapshot, wherein the set of snapshot chunks comprises at least some adaptively sized snapshot chunks having different sizes than other ones of the snapshot chunks of the set. For example the snapshot chunks may have been adaptively sized based on an access pattern as described in FIG. 1A. Additionally or alternatively, the adaptively sized snapshot chunks may have been adaptively sized based on commonly used launch volume data (to be stored in a cache) versus unique volume data (to be stored in a separate storage from the cache) as further described in FIGS. 5A-7B. In some embodiments, the adaptively sized snapshot chunks may be retrieved according to an order indicated in an optimized manifest, such as manifest 190 shown in FIG. 1C.

Figure 5A:
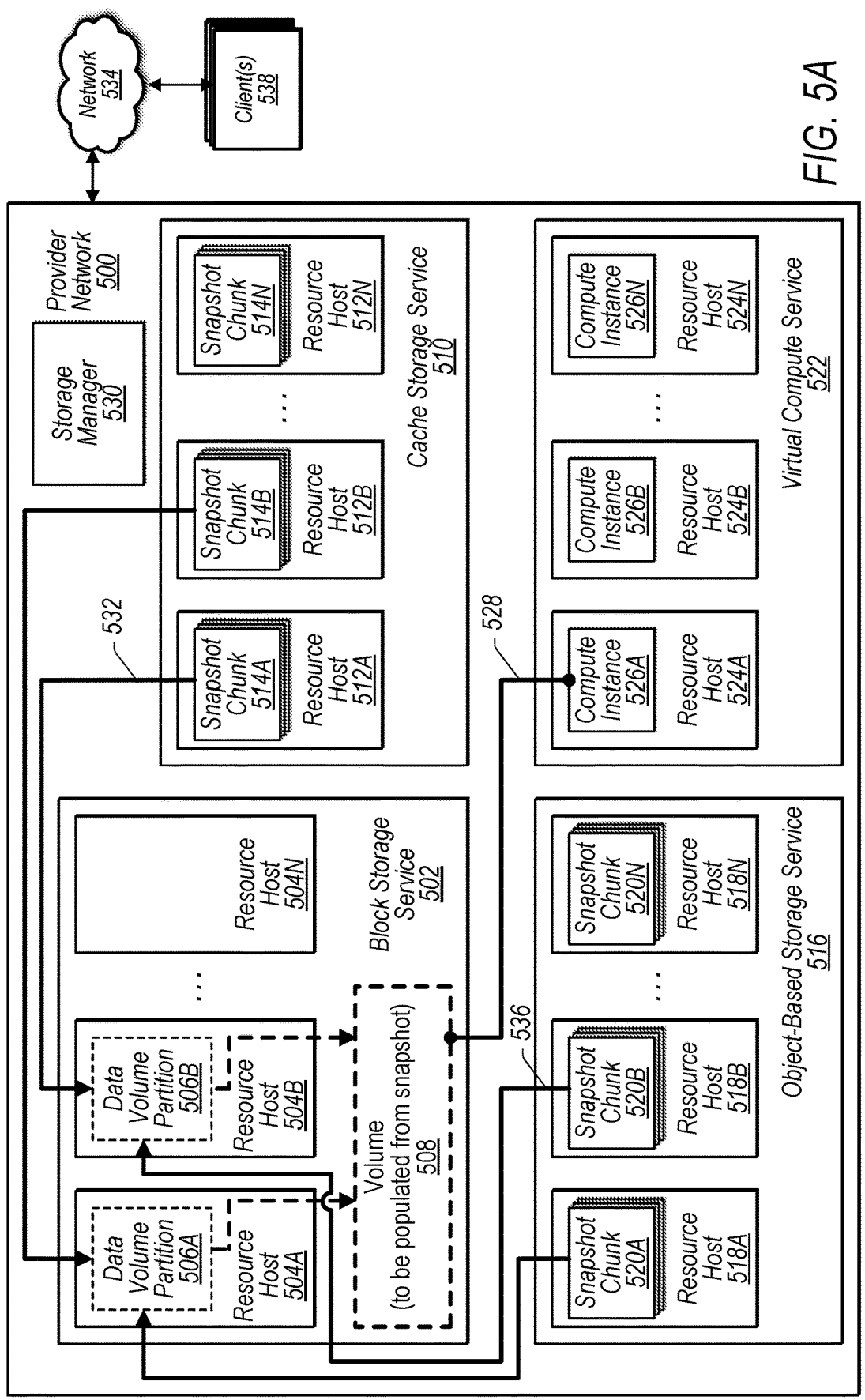
FIG. 5A illustrates a block diagram of a provider network and illustrates a block-based storage volume of a block storage service of the provider network being populated with volume data from different sized snapshot chunks stored in different storage systems of the provider network (e.g. a cache storage service and an object-based storage service), according to some embodiments.

FIG. 5A illustrates a block diagram of a provider network and illustrates a block-based storage volume of a block storage service of the provider network being populated with volume data from different sized snapshot chunks stored in different storage systems of the provider network (e.g. a cache storage service and an object-based storage service), according to some embodiments.

Provider network 500 may be set up by an entity such as a company or a public sector organization to provide one or more services (such as various types of cloud-based computing or storage) accessible via the Internet and/or other networks to users/clients 538. Provider network 500 may include numerous data centers hosting various pools of resource hosts, such as collections of physical and/or virtualized computer servers, storage devices, networking equipment and the like (e.g., computing system 1400 described below with regard to FIG. 14), needed to implement and distribute the infrastructure and services offered by the provider network 500. In some embodiments, provider network 500 may provide computing resources, such as virtual compute service 522, storage services, such as block-based storage service 502, cache storage service 510, and object-based storage service 516 (which may include various storage types such as object/key-value based data stores or various types of database systems), and/or any other type of network-based services. Users/clients 538 may access these various services offered by provider network 500 via network 534. Likewise network-based services may themselves communicate and/or make use of one another to provide different services. For example, computing resources offered to clients 538 in units called "instances," such as virtual or physical compute instances or storage instances, may make use of other resources, such as data volume partitions 506A through 506B implementing volume 508, wherein the resource hosts 504A through 504B hosts the data volume partitions implementing the volume 508 providing virtual block storage for the compute instances 526A through 526N. For example, volume 508 is attached to compute instance 526A via virtual attachment 528. In some embodiments, multiple compute instances 526 may be attached to a same volume, such as volume 508.

A cloud provider networks often provide access to computing resources via a defined set of regions, availability zones, and/or other defined physical locations where a cloud provider network clusters data centers. In many cases, each region represents a geographic area (e.g., a U.S. East region, a U.S. West region, an Asia Pacific region, and the like) that is physically separate from other regions, where each region can include two or more availability zones connected to one another via a private high-speed network, e.g., a fiber communication connection. A physical or infrastructure availability zone (also known as an availability domain, or simply a "zone") refers to an isolated failure domain including one or more data center facilities with separate power, separate networking, and separate cooling from those in another availability zone. Preferably, physical availability zones within a region are positioned far enough away from one other that the same natural disaster should not take more than one availability zone offline at the same time, but close enough together to meet a latency requirement for intra-region communications.

Furthermore, regions of a cloud provider network are connected to a global "backbone" network which includes private networking infrastructure (e.g., fiber connections controlled by the cloud provider) connecting each region to at least one other region. This infrastructure design enables users of a cloud provider network to design their applications to run in multiple physical availability zones and/or multiple regions to achieve greater fault-tolerance and availability. For example, because the various regions and physical availability zones of a cloud provider network are connected to each other with fast, low-latency networking, users can architect applications that automatically failover between regions and physical availability zones with minimal or no interruption to users of the applications should an outage or impairment occur in any particular region. In some embodiments, provider network 500 may be such a cloud provider network.

The traffic and operations of the provider network 500 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

As noted above, virtual compute service 522 may offer various compute instances to users/clients 538. A virtual compute instance may, for example, be implemented on one or more resource hosts 524 that comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 522 in different embodiments, including special purpose computer servers, storage devices, network devices and the like. In some embodiments instance clients 538 or any other users may be configured (and/or authorized) to direct network traffic to a compute instance. In various embodiments, compute instances may attach or map to one or more data volumes, such as data volume 508, provided by block-based storage service 502 in order to obtain persistent block-based storage for performing various operations.

Compute instances may operate or implement a variety of different platforms, such as general purpose operating systems, application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 538 to access an instance.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, provider network 500 may also implement block-based storage service 502 for providing storage resources and performing storage operations. Block-based storage service 502 is a storage system, composed of a pool of multiple independent resource hosts 504A, 504B, through 504N (e.g., server block data storage systems), which provide block level storage for storing one or more sets of data volumes, such as data volume partition(s) 506A, 506B, etc. Data volumes, such as volume 508, (comprising data volume partitions 506A and 506B) may be mapped to particular clients, providing virtual block-based storage (e.g., hard disk storage or other persistent storage) as a contiguous set of logical blocks. In some embodiments, a data volume, such as volume 508, may be divided up into multiple data chunks (including one or more data blocks) for performing other block storage operations, such as snapshot operations or replication operations. A volume snapshot of a data volume, such as volume 508, may be a fixed point-in-time representation of the state of the data volume 508. In some embodiments, volume snapshots may be stored remotely from a resource hosts 504 maintaining a data volume, such as in another storage service, such as object-based storage service 516 and/or cache storage service 510. Snapshot operations may be performed to send, copy, and/or otherwise preserve the snapshot of a given data volume in another storage location, such as a remote snapshot data store in other storage service, such as object-based storage service 516 or cache storage service 510. In some embodiments, a snapshot stored in object-based storage service 516 and/or cache storage service 510 may be a launch volume or machine image. For example, in some embodiments, commonly used machine images may be created as snapshots and may be used by clients to launch a compute instance 526 with a particular configuration or using a particular operating system.

In some embodiments, an object-based storage service, such as object-based storage service 516, may include a plurality of resource hosts that store snapshot objects and/or other storage objects. As referred to herein the snapshot objects and resource hosts storing the snapshot objects may form a snapshot archive. For example, object-based storage service 516 includes resource hosts 518A and 518B through 518N storing snapshot objects 520A and 520B through 520N.

In addition to object-based storage service 516, provider network 500 may implement other network-based services, which may include various different types of analytical, computational, storage, or other network-based system allowing users/clients 538, as well as other services of provider network 500 (e.g., block-based storage service 502, virtual compute service 522, cache storage service 510, and/or object-based storage service 516) to perform or request various tasks.

In some embodiments, cache storage service 510 includes resource hosts 512A, 512B through 512N storing snapshot objects 514A, 514B through 514N. In some embodiments, resource hosts 512 may be located in provider network 500 proximate to resource hosts 504 of block-storage service 502. In some embodiments, resource hosts 512 may be implemented using un-used capacity of resource hosts 504. Said another way, in some embodiments a cache storage for a block-based storage service may be implemented using local capacity of resource hosts of the block-based storage service, or may be implemented using resource hosts located in a proximate network location to the resource hosts of the block-based storage service.

Users/clients 538 may encompass any type of client configurable to submit requests to provider network 500. For example, a given client 538 may include a suitable version of a web browser, or may include a plug-in module or other type of code module configured to execute as an extension to or within an execution environment provided by a web browser. Alternatively, a client 538 may encompass an application such as a database application (or user interface thereof), a media application, an office application or any other application that may make use of compute instances 526, a data volume 508, or other network-based service in provider network 500 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 538 may be configured to generate network-based services requests according to a Representational State Transfer (REST)-style network-based services architecture, a document- or message-based network-based services architecture, or another suitable network-based services architecture. In some embodiments, a client 538 (e.g., a computational client) may be configured to provide access to a compute instance 526 or data volume 508 in a manner that is transparent to applications implemented on the client 538 utilizing computational resources provided by the compute instance 526 or block storage provided by the data volume 508.

Clients 538 may convey network-based services requests to provider network 500 via external network 534. In various embodiments, external network 534 may encompass any suitable combination of networking hardware and protocols necessary to establish network-based communications between clients 538 and provider network 500. For example, a network 534 may generally encompass the various telecommunications networks and service providers that collectively implement the Internet. A network 534 may also include private networks such as local area networks (LANs) or wide area networks (WANs) as well as public or private wireless networks. For example, both a given client 538 and provider network 500 may be respectively provisioned within enterprises having their own internal networks. In such an embodiment, a network 534 may include the hardware (e.g., modems, routers, switches, load balancers, proxy servers, etc.) and software (e.g., protocol stacks, accounting software, firewall/security software, etc.) necessary to establish a networking link between given client 538 and the Internet as well as between the Internet and provider network 500. It is noted that in some embodiments, clients 538 may communicate with provider network 500 using a private network rather than the public Internet.

Provider network 500 also includes storage manager 530, which manages snapshots and may perform other storage related tasks. For example, storage manager 530 may adaptively determine sizes for snapshot chunks of snapshots. In some embodiments, storage manager 530 may size snapshot chunks to correspond to sizes of data being stored in the respective snapshot chunks. Additionally, the storage manager 530 may segregate snapshot data that is commonly used from client or machine instance specific snapshot data that is unique to a particular client or particular machine instance and concentrate the different types of snapshot data into differently sized snapshot chunks. Additionally, or alternatively the storage manager 530 may segregate snapshot data that is frequently used (even if not common to multiple clients). Using launch volumes as an example, a snapshot of a launch volume may include launch volume data that is commonly used by various clients or machine instances when launching an operating system using the launch volume and may also include client or machine instance specific launch volume data that is unique to a particular client or unique to a particular machine instance and that is not applicable to other clients or other machine instances. In such an example, storage manager 530 may adaptively size snapshot chunks of a snapshot to correspond to the respective sizes of the common launch volume data and the specific launch volume data. For example, larger sized snapshot chunks may be used to store the common launch volume data, while smaller sized snapshot chunks are used to store the client/machine instance specific launch volume data. Also, as another example, a snapshot of a launch volume may include launch volume data that is frequently used by various clients or a single client. In such an example, storage manager 530 may adaptively size snapshot chunks of a snapshot to correspond to the respective sizes of the frequently used launch volume data. In some embodiments, storage manager 530 may be implemented via distributed components of the provider network in both the control plane and data plane. For example, in some embodiments, storage manager may be implemented via coordination of multiple other control elements in the control plane and data plane.

Additionally, storage manager 530 may cause different types of snapshot chunks to be stored in different storage locations. For example, the larger common launch volume snapshot chunks may be stored in a cache, such as cache storage service 510 (e.g. snapshot chunks 514A through 514N stored on resource hosts 512A through 512N). Also, the smaller client/machine instance specific snapshot chunks may be stored in object-based storage service 516 as snapshot chunks 520A through 120N stored on resource hosts 518A through 518N. In some embodiments, the larger common launch volume snapshot chunks may be stored in the object-based storage service 516 with the client/machine instance specific snapshot chunks and may additionally be stored (e.g. a second copy) in the cache storage service 510.

Also, in some embodiments, storage manager 530 may coordinate populating a volume of the block-based storage service, such as volume 508 of block-based storage service 502, from a snapshot comprising snapshot chunks of different sizes that are stored in different storage services. For example, at 532 storage manager 530 causes common launch volume data included in snapshot chunks 514A and 514B to be retrieved and provided to data volume partitions 506A and 506B to populate volume 508. Also, at 536 storage manager 530 causes client/machine instance specific launch volume data included in snapshot chunks 520A and 520B to be retrieved and provided to data volume partitions 506A and 506B to populate volume 508. The snapshot chunks 514A and 514B and the snapshot chunks 520A and 520B may be re-mapped into volume blocks, for example via a re-mapper as shown in FIG. 5B (e.g. re-mapping process 562).

In some embodiments, snapshot chunks stored in cache storage service 510 are also stored in object-based storage service 516 and storage manager 530 may first attempt to populate a volume from the cache storage service 510. Then if required snapshot chunks are not stored in the cache storage service 510, the storage manager 530 may retrieve the required snapshot chunks from object-based storage service 516. By segregating the client/machine instance specific launch volume data into separate snapshot chunks, "cache-misses" may be avoided. For example, if client specific or machine instance specific launch volume data is mixed with common launch volume data in a large snapshot chunk, only a slight difference in client/machine instance specific volume data may render a given snapshot chunk unacceptable for use in populating volume 508, and therefore cause the mixed common and client/machine instance specific launch volume data to be retrieved from the object-based storage service 516. However, when the client/machine instance specific launch volume data is omitted from larger snapshot chunks in the cache storage service 510, the larger snapshot chunks may be more commonly used to populate a plurality of launch volumes for a plurality of clients and/or a plurality of machine instances. Thus, sizing snapshot chunks differently and segregating common launch volume data from client/machine specific improves cache efficiency and also reduces wait times for populating volumes, such as launch volumes, from a snapshot.

Figure 5B:
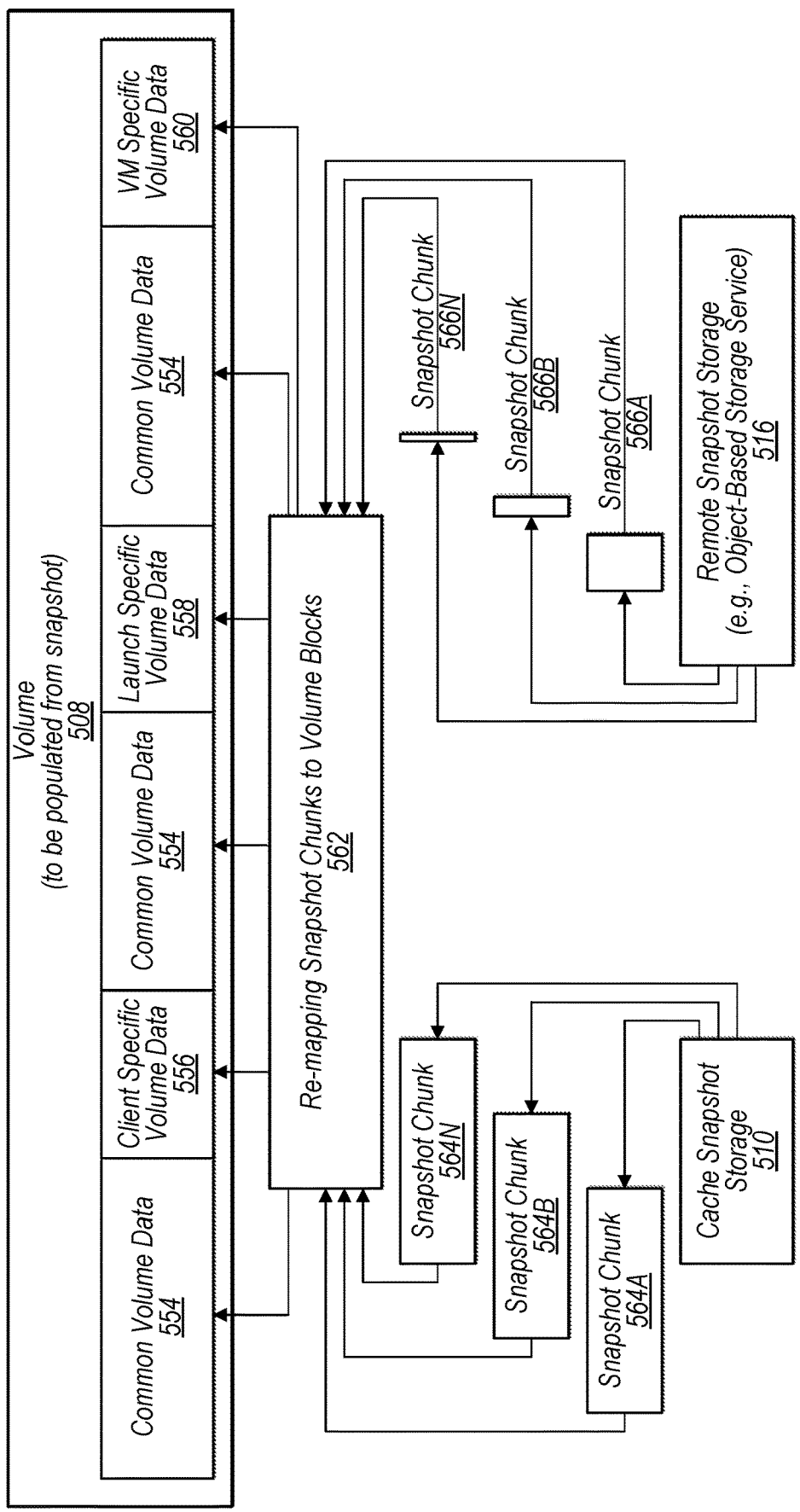
FIG. 5B illustrates a more detailed view of the block-based storage volume of the block storage service of the provider network being populated with volume data from the different sized snapshot chunks, wherein the different sized snapshot chunks are re-mapped into standard sized volume blocks, according to some embodiments.

FIG. 5B illustrates a more detailed view of a block-based storage volume of the block storage service of the provider network being populated with volume data from the different sized snapshot chunks, wherein the different sized snapshot chunks are re-mapped into standard sized volume blocks, according to some embodiments.

As shown in FIG. 5B, volume 508 that is being populated from snapshot chunks may include both common volume data 554, and client or machine instance specific volume data, such as client specific volume data 556, launch specific volume data 558, or virtual machine specific volume data 560. Also as shown in FIG. 5B, common volume data may be included in snapshot chunks having one or more larger sizes, such as snapshot chunks 564A-564N, while non-common volume data may be included in snapshot chunks having one or more smaller sizes, such as snapshot chunks 566A-566N. In some embodiments, a re-mapper 562 re-maps the snapshot chunks 564A-564N and snapshot chunks 566A-566N into standard sized volume blocks. For example the snapshot chunks 564A-564N and the snapshot chunks 566A-566N may range in size from 4 KB to 512 KB, but may be re-mapped into 4 KB volume blocks of volume 508 via re-mapper 562. Additionally or alternatively, the snapshot chunks 564 and 566 may further be adaptively sized based on an access pattern as shown in FIGS. 1A/1B.

In some embodiments, the specific launch volume snapshot chunks may include configuration information generated as part of performing one or more configurations for an operating system, such as specifying where log files are to be stored, specifying security IDs for an operating system, determining hardware specific configurations for implementing the operating system, installation of device drivers for the operating system, specifying user account information, specifying language selection, specifying local settings, etc. In contrast, common launch volume snapshot chunks may include operating system instructions that are applicable regardless of the hardware specific configurations, user, user selections, etc.

Figure 6A:
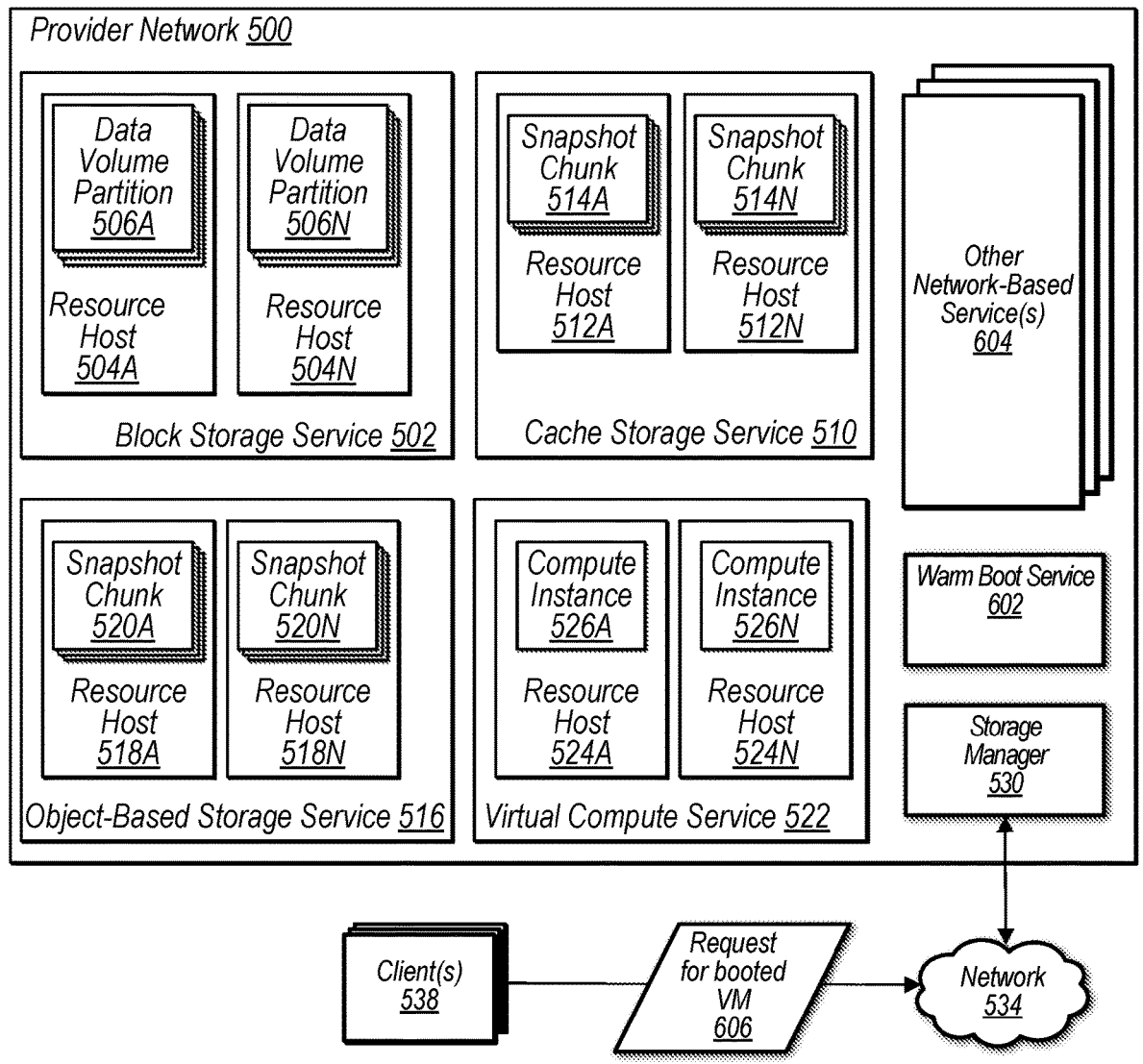
FIG. 6A illustrates a block diagram of the provider network, wherein the provider network further comprises a warm boot service and other network-based services, according to some embodiments.

FIG. 6A illustrates a block diagram of the provider network, wherein the provider network further comprises a warm boot service and other network-based services, according to some embodiments.

In some embodiments, a provider network, such as provider network 500 illustrated in FIG. 5A, may further include a warm boot service 602 and other network-based services 604, which may include various different types of analytical, computational, storage, or other network-based systems allowing clients 538, as well as other services of provider network 500 (e.g., block-based storage service 502, virtual compute service 522, cache storage service 510, warm boot service 602, and/or object-based storage service 516) to perform or request various tasks.

In some embodiments, clients 538 may request (606) a machine instance booted with a particular operating system and/or booted using a particular machine image. As further discussed in regard to FIG. 6B, a warm boot service 602 may anticipate such a request and generate a warm boot volume that expedites providing the client 538 with the requested machine instance with the particular operating system and/or booted using the particular machine image.

Figure 6B:
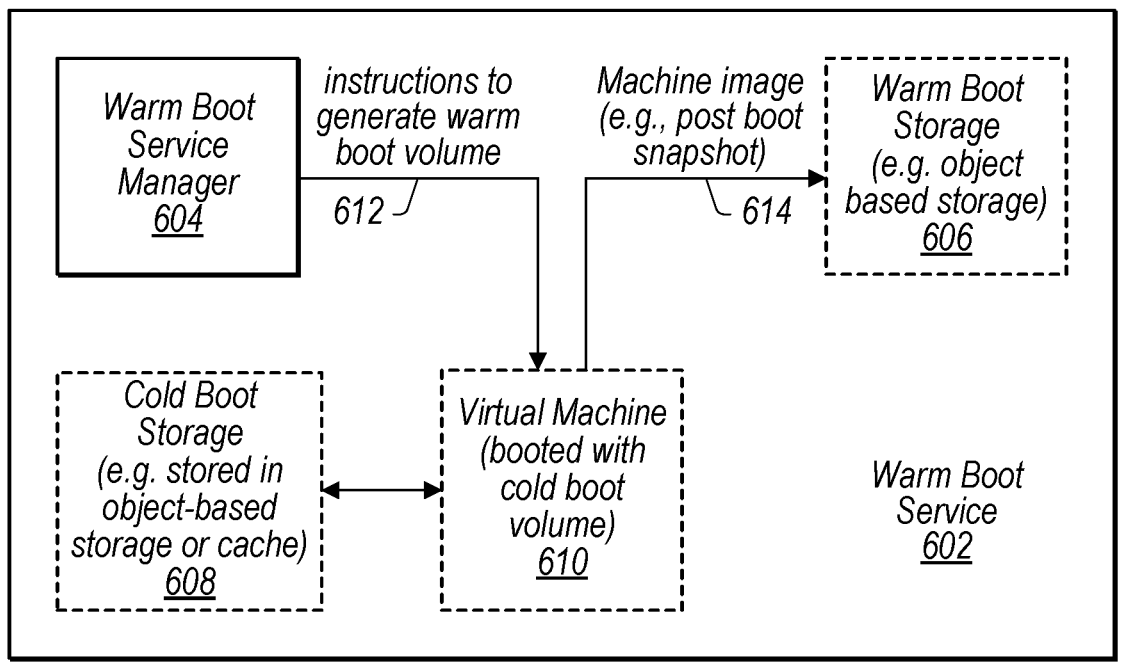
FIG. 6B illustrates a more detailed view of a warm boot service showing additional components and process of the warm boot service, according to some embodiments.

FIG. 6B illustrates a more detailed view of the warm boot service showing additional components and process of the warm boot service, according to some embodiments.

In some embodiments, a warm boot service, such as warm boot service 602, may include a warm boot service manager 604 that anticipates when a warm boot volume is needed for a particular client or machine instance. For example, a warm boot service manager 604 may monitor customer or client interactions to determine a client is likely to request a compute instance with a particular operating system or machine image. In response to determining that a warm boot volume is needed, the warm boot service manager 604 issues instructions 612 to generate a warm boot volume. These instructions cause a virtual machine 610 to be booted with a cold boot volume 608. For example, a cold boot volume may include a particular operating system or machine image, but may not be configured for a particular client or virtual machine. Once booted, the virtual machine 610 may be configured for the particular client or machine instance type. For example, the warm boot service 602 may have access to client information about the client likely to request the compute instance with the particular operating system or machine image and may configure booted virtual machine 610 for the particular client. The warm boot service 602 at 614 causes a machine image snapshot to be taken of the booted and configured virtual machine 610 and stores the snapshot as warm boot volume 606. As further discussed in FIGS. 9-11, the warm boot volume may then be used to boot a machine instance for the particular client that is already configured with the client's information.

Figure 7A:
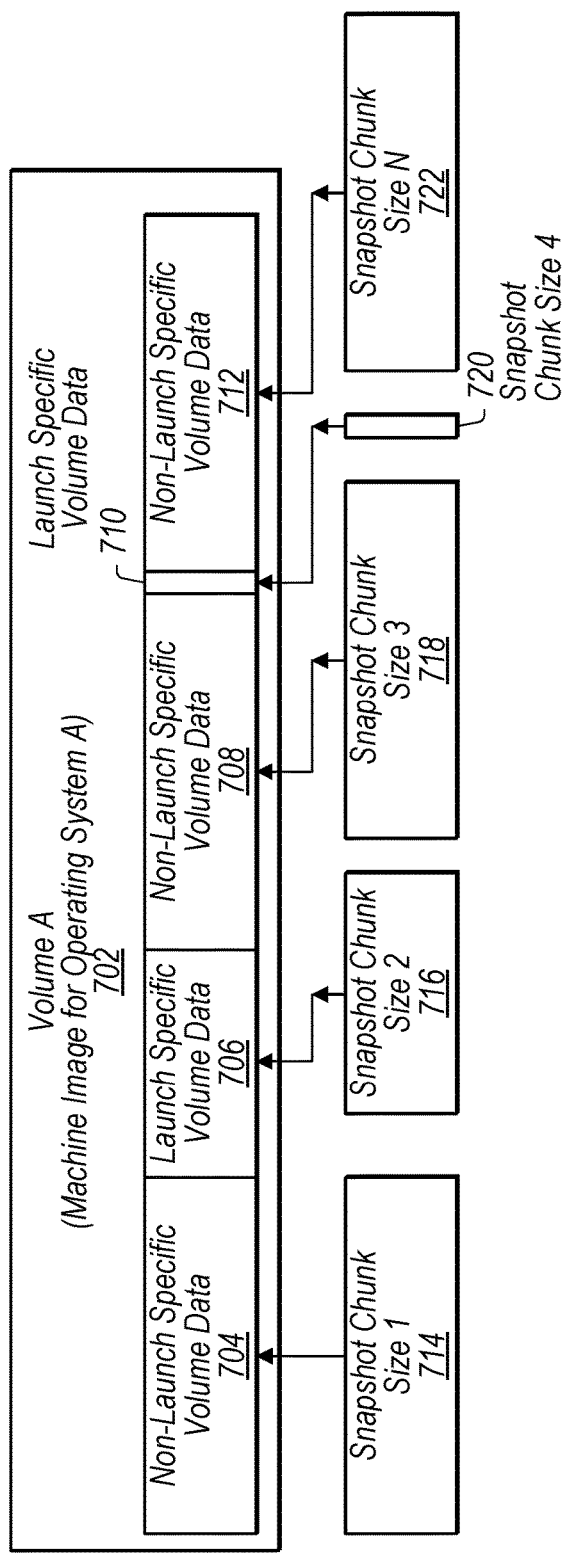
FIGS. 7A/7B illustrate different block-based storage volumes being populated with volume data for different machine images or launch volumes, wherein different sized snapshot chunks are used to populate the different block-based storage volumes, and wherein some of the differently sized snapshot chunks comprise data for portions of the respective machine images or launch volumes that are unique to a particular client or machine instance configuration and other ones of the differently sized snapshot chunks comprise data for portions of the respective machine images or launch volumes that are common portions generally usable by different clients or in different machine instance configurations, according to some embodiments.
Figure 7B:
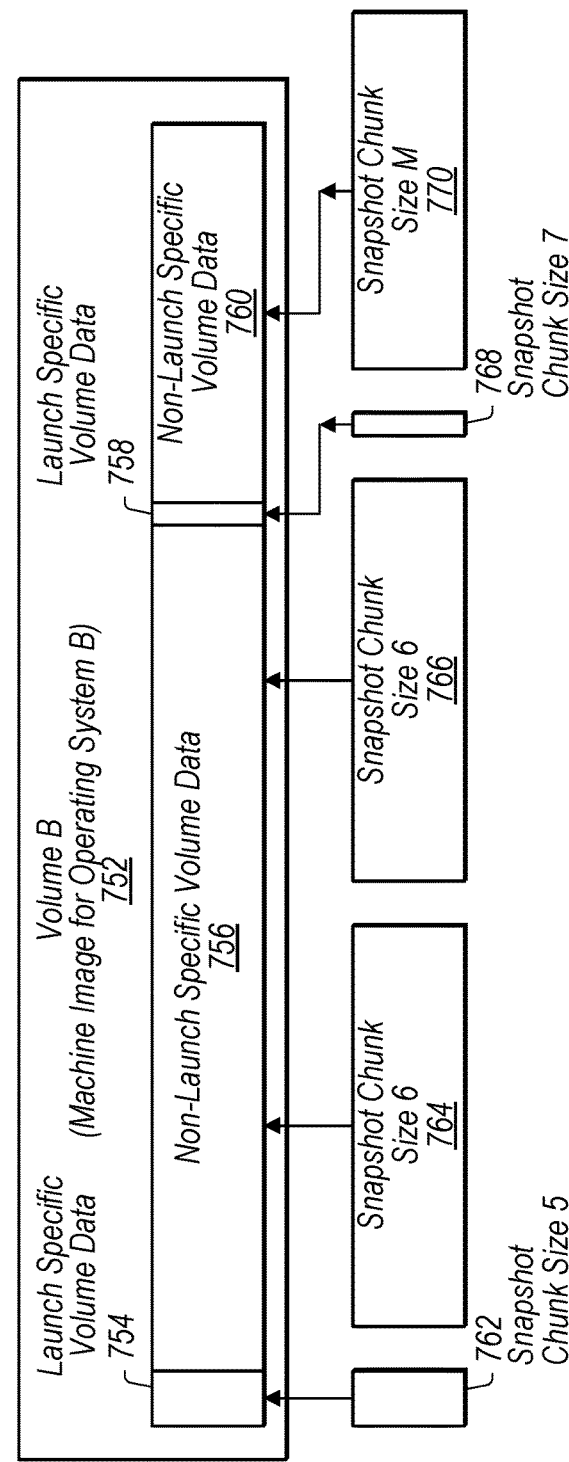

FIGS. 7A/7B illustrate different block-based storage volumes being populated with volume data for different machine images or launch volumes, wherein different sized snapshot chunks are used to populate the different block-based storage volumes based on whether portions of the respective machine images or launch volumes are unique to a particular client or machine instance configuration, or whether the portions of the respective machine images or launch volumes are common portions generally usable by different clients or in different machine instance configurations, according to some embodiments.

As a further example, volume A (702) and volume B (752) represent two different launch volumes or machine images, wherein volume A and volume B comprise machine images for different operating systems. The different operating systems may have different access patterns, sizes, and/or types of client/machine specific volume data and also different sizes of common volume data. For example, volume A (702) includes three sections of non-launch specific volume data (e.g. 704, 708, and 712). In contrast, volume B (752) includes a large non-launch specific volume data portion 756 and another smaller non-launch specific volume data portion 760. In some embodiments, snapshot chunks for volume A may include snapshot chunks sized to approximately match respective sizes of non-launch specific volume data 704, 708, and 712, such as snapshot chunks 714, 718, and 722. Also, snapshot chunks for volume B may include snapshot chunks, such as snapshot chunks 764 and 766 that both store portions of non-launch specific volume data 756. The snapshot chunks for volume B may also include snapshot chunk 770 that is sized to approximately match the size of non-launch specific volume data 760.

Additionally, volume A (702) and volume B (752) may include different quantities and types of launch specific volume data (e.g. volume data that is particular to a launched virtual machine implementation of the machine image for a particular client). In such a situation, snapshot chunks for the specific volume data may be sized to approximately match respective sizes of the specific volume data. For example, snapshot chunk 714 may be sized to match a size of launch specific volume data 706 and snapshot chunk 720 may be sized to match a size of launch specific volume data 710. Likewise for volume B (752), snapshot chunk 762 may be sized to approximately match a size of launch specific volume data 754 and snapshot chunk 786 may be sized to approximately match a size of launch specific volume data 758. Note that in some embodiments, both different sizes of snapshot chunks and different quantities of snapshot chunks may be adapted to correspond to common and specific volume type sizes of volume data for a given volume.

Figure 8A:
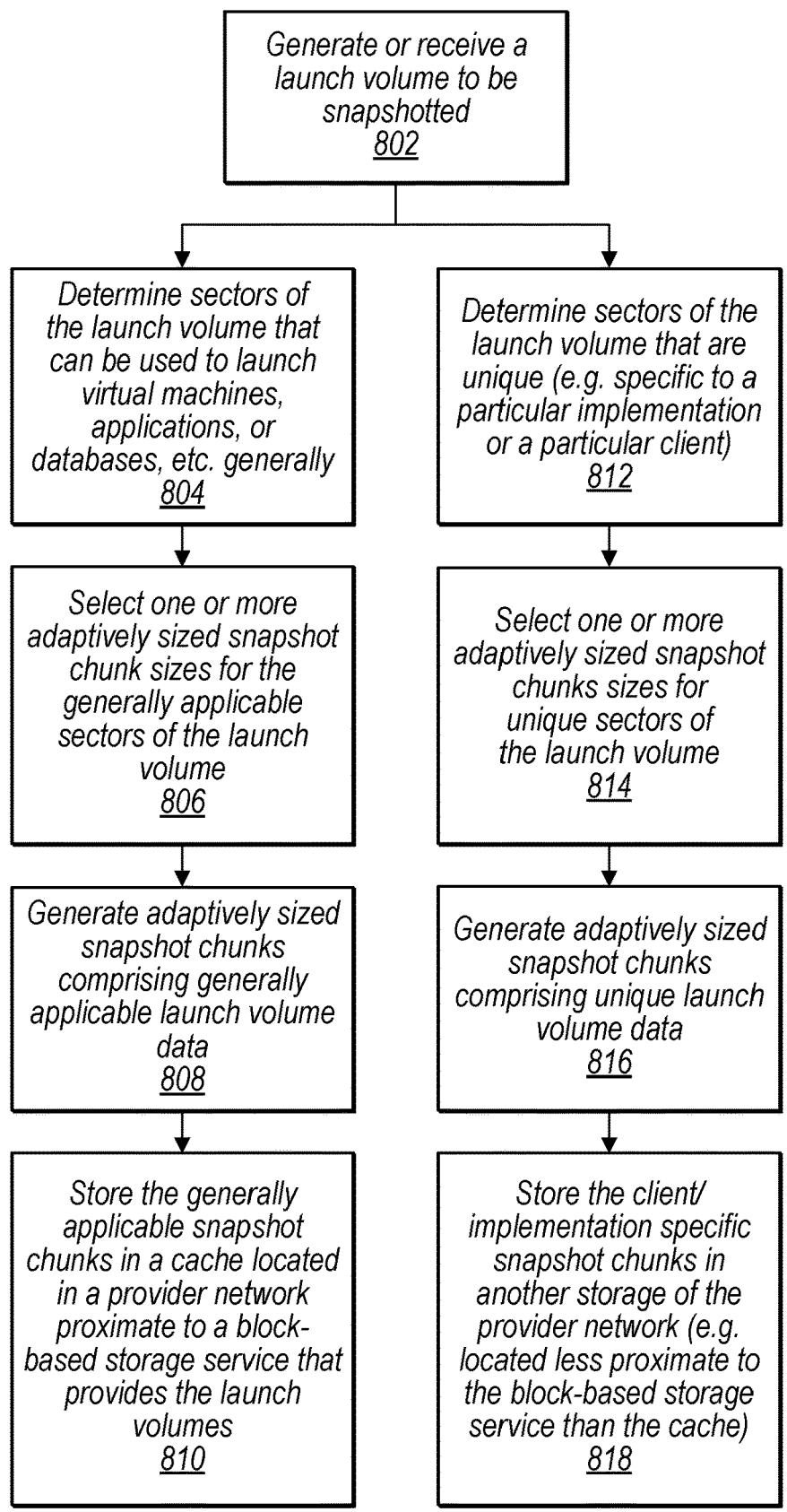
FIG. 8A is a flow diagram illustrating a process for generating snapshot chunks for a launch volume using adaptively sized snapshot chunks, according to some embodiments.

FIG. 8A is a flow diagram illustrating a more detailed example process for generating snapshot chunks for a launch volume using adaptively sized snapshot chunks, according to some embodiments.

At 802, a snapshot service, such as may be implemented using storage manager 530, generates or receives a launch volume to be snapshotted. For example, the launch volume may be a cold boot volume that corresponds to a particular operating system, or may be a warm boot volume generated for a particular client and/or for a particular machine instance configuration. At block 804, the snapshot service determines portions of the launch volume that are non-unique such that they can be used to launch machine instance generally (e.g. common volume data). At 806, the storage manager adaptively sizes a size (or sizes) of a snapshot chunk (or set of snapshot chunks) based on the size of the non-unique volume data. In some embodiments, a default snapshot size may be used for non-unique volume data and a customized snapshot size may be used for unique volume data. However, in other embodiments, snapshot chunk sizes may be adaptively sized for both unique and non-unique portions of a launch volume. At 808, the storage manager generates snapshot chunks having a size (or sizes) corresponding to a size (or sizes) selected at 806 and at 810 the storage manager causes the snapshot chunks having the first size or sizes to be stored, such as in a cache storage service located in a provider network proximate to a block-based storage service that will use the snapshot chunks to populate volumes of the block-based storage service for use in launching machine instances.

At 812, the storage manager also determines unique portions of the launch volume (e.g. portions that are specific to a particular machine instance implementation or a particular client). At 814, the storage manager selects one or more second sizes for snapshot chunks that are to store the unique volume data based on the respective sizes of the unique volume data included in the launch volume. At 816, the storage manager causes snapshot chunks to be generated having the selected second sizes and at 818 stores the snapshot chunks having the second sizes and comprising the unique launch volume data. For example, the snapshot chunks for the unique volume portions of the launch volume may be stored in another storage of the provider network, such as an object-based storage service that is less proximate to the block-based storage host resources than the resource hosts of the cache storage service.

Figure 8B:
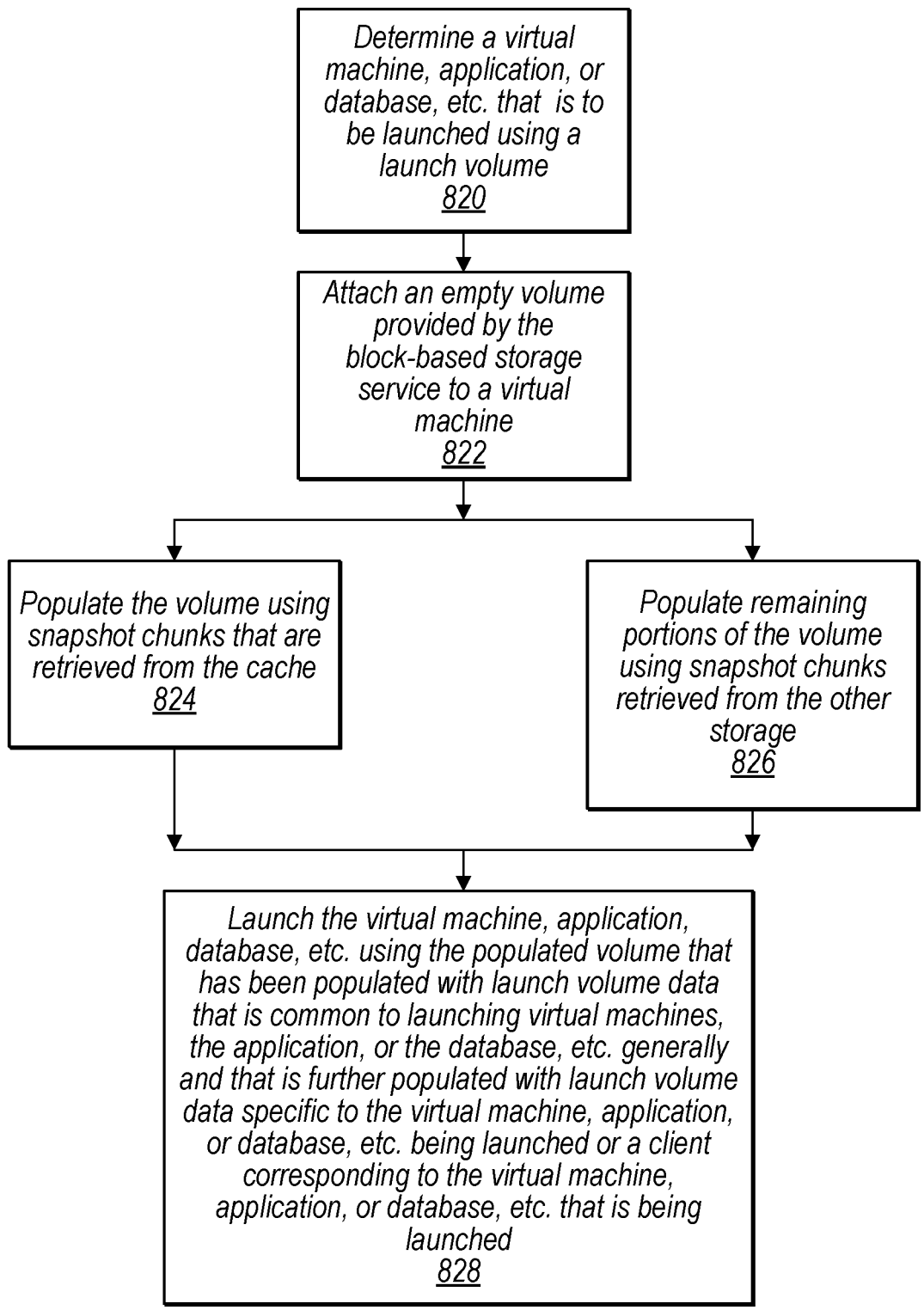
FIG. 8B is a flow diagram illustrating a process for populating a launch volume and launching a machine instance using the populated launch volume, wherein different sized snapshot chunks are used to populate the launch volume, according to some embodiments.

FIG. 8B is a flow diagram illustrating a process for populating a launch volume and launching a machine instance using the populated launch volume, wherein different sized snapshot chunks are used to populate the launch volume, according to some embodiments.

At 820, the storage manager may determine a machine instance is to be launched using a snapshot of the launch volume, such as was generated in FIG. 8A. At 822, the storage manager coordinates with the block-based storage service to attach a volume to a machine instance, such as a virtual compute instance of virtual compute service 522. At 824 and 826 the volume is populated with the snapshot chunks stored in the cache storage service and the snapshot chunks stored in the object-based storage service. In some embodiments, 824 and 826 may be performed before or after 822. For example, in some embodiments, the volume may be populated prior to being attached to the machine instance. At 828, the machine instance is launched using the populated volume populated with launch volume data that is common to launching virtual machines generally and is further populated with launch volume data specific to the virtual machine being launched or a client corresponding to the virtual machine that is being launched. The launched virtual machine may then be made available for use by a client or customer.

FIG. 9 is a flow diagram illustrating a process for booting a machine instance using a cold boot volume, according to some embodiments.

In some embodiments, a machine instance may be booted using a cold boot process 900 without using a warm boot volume, or a warm boot volume preparation process 1000 may be used to generate a warm boot volume, and the machine instance may alternatively be booted using a warm boot volume according to warm boot process 700.

In cold boot process 900, at 902 a storage manager (or a virtual compute service) receives an application programmatic interface (API) call for a virtual machine with a specified operating system and/or a specified machine image. In response, at 904, a virtual machine is launched and at 906 the virtual machine is initially booted using a cold boot volume. For example, cold boot volume data may be populated into an attached boot volume from a cache storage service (or other storage location). At 908, system preparation and/or out of box experience configuration operations are performed on the compute instance. Subsequently, at 910, the compute instance is re-started and at 912 the operating system is booted on the virtual machine, wherein the operating system is booted with the configuration information generated at 908. At 914, the re-booted machine instance is made available for use by a client or customer.

FIG. 10 is a flow diagram illustrating a process for generating a warm boot volume, according to some embodiments.

In some embodiments, a warm boot service, such as warm boot service 202, may perform a warm boot volume preparation process 1000. For example, at 1002, the warm boot service may determine that a virtual machine is to be booted for a client or customer with a particular operating system and/or machine image. In some embodiments, 1002 may be performed pre-emptively before the client or customer actually finalizes a request for the machine instance with the particular operating system and/or machine image. At 1004, the warm boot service pre-emptively launches a machine instance and at 1006 boots the machine image using a cold boot volume. At 1008, the warm boot service performs system preparation and/or out of box experience configuration operations using information known about the client that is determined at 1002 to likely request the machine instance with the particular operating system and/or machine image. At 1010 one or more optimization operations are performed for the warm boot volume to determine snapshot chunk sizes for a snapshot of the warm boot volume. For example, the optimization operations may include sizing the warm boot snapshot chunks differently based on which snapshot chunks include unique client specific launch information and which snapshot chunks include general launch information. Also, the optimization operations may include sizing the snapshot chunks based on an access pattern for the warm boot volume, for example as described in FIG. 1A. Also, the optimization operations may include generating an optimized manifest for the warm boot volume, such a manifest 190 shown in FIG. 1C. At 1012, the warm boot service stores a snapshot of the booted and configured machine image as a warm boot volume, wherein the snapshot comprises the optimized snapshot chunks sized based on the optimization operations performed at 1010.

FIG. 11 is a flow diagram illustrating a process for booting a machine instance using a warm boot volume, according to some embodiments.

A storage manager may perform warm boot process 1100 to boot a machine image using a warm boot volume, such as may be generated using warm boot volume preparation process 1000. For example, at 1102, the storage manager launches a machine instance and at 1104, the storage manager causes an operating system of the machine instance to be booted using the warm boot volume generated at 1010. For example, system preparation and/or out of box experience configuration operations may have already been performed for the machine instance and operating system. At 1106, the storage manager makes the booted virtual machine configured with the particular operating system and/or machine image available for use by a client or customer.

Figure 12:
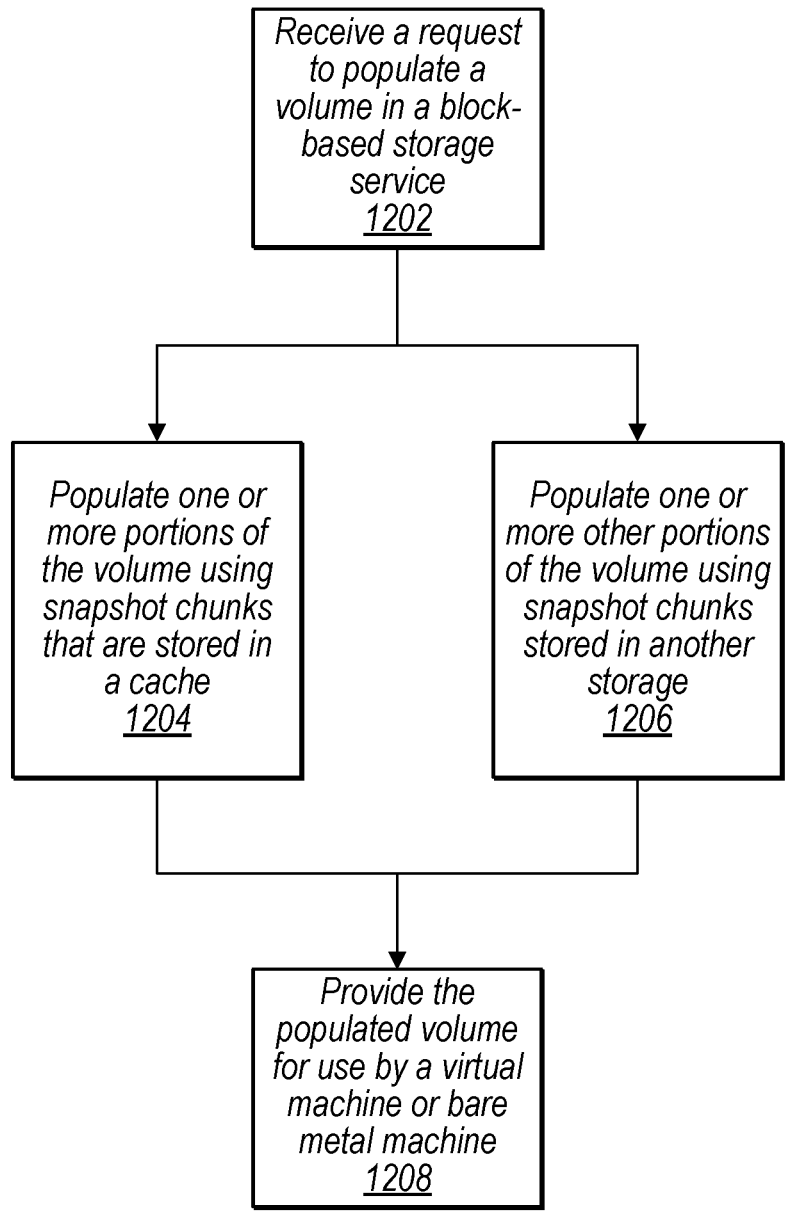
FIG. 12 is a flow diagram illustrating a process for populating a volume of a block-based storage service using snapshot chunks having different sizes and stored in different storage locations, according to some embodiments.

FIG. 12 is a flow diagram illustrating a process for populating a volume of a block-based storage service using snapshot chunks having different sizes, according to some embodiments.

In some embodiments, a storage manager may receive, at 1202, a request to populate a volume in a block-based storage service. At 1204, the storage manager causes one or more portions of the volume to be populated using snapshot chunks having a first size that are stored in a first location (e.g. a cache) and at 1206, the storage manager causes one or more other portions of the volume to be populated using snapshot chunks having a second size and that are stored in a second location (e.g. a block-based storage service). In some embodiments, the snapshot chunks having different sizes may be re-mapped into volume blocks conforming to a standard size for the volume blocks. At 1208, the storage manager provides the populated volume for use by a virtual machine or bare metal instance for launching an operating system or other application of the virtual machine or bare metal instance. For example the populated volume may be attached to the virtual machine or bare metal instance and may be used as a launch volume for the virtual machine or bare metal instance, or an application, database, etc. executing via the virtual machine or bare metal instance.

Figure 13:
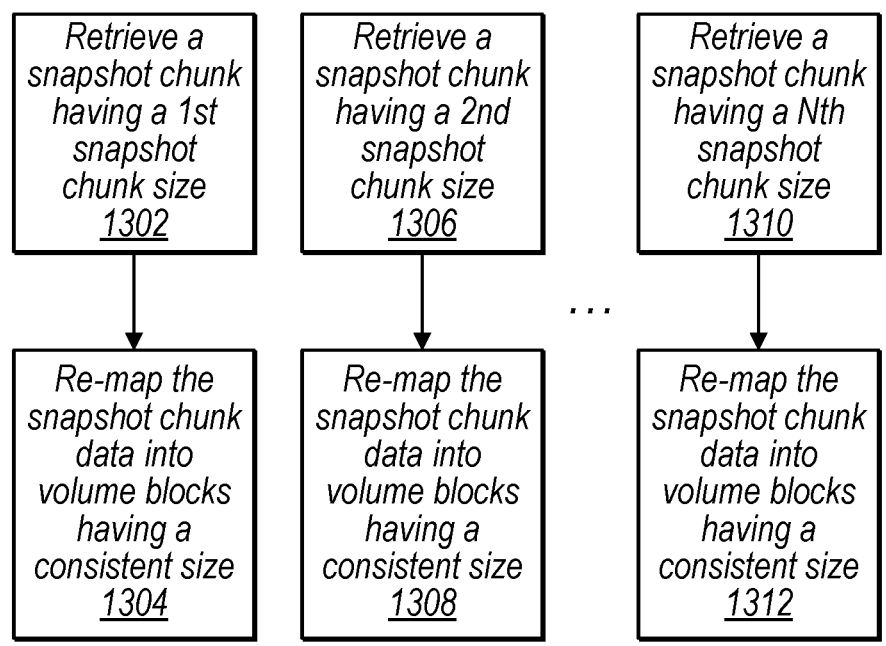
FIG. 13 is a flow diagram illustrating processes for re-mapping snapshot chunks having a plurality of different snapshot chunk sizes into standard sized volume blocks, according to some embodiments.

FIG. 13 is a flow diagram illustrating processes for re-mapping snapshot chunks having a plurality of different snapshot chunk sizes into standard sized volume blocks, according to some embodiments.

As shown in 1302, 1304, and 1306, a storage manager may retrieve snapshot chunks having various snapshot chunk sizes (e.g. sizes 1 through N) and may re-map the volume data included in the various sized snapshot chunks into volume blocks have a consistent (e.g. standard) size. For example, the various sized snapshot chunks may be re-mapped into consistent volume blocks at 1304, 1308, and 1312.

Figure 14:
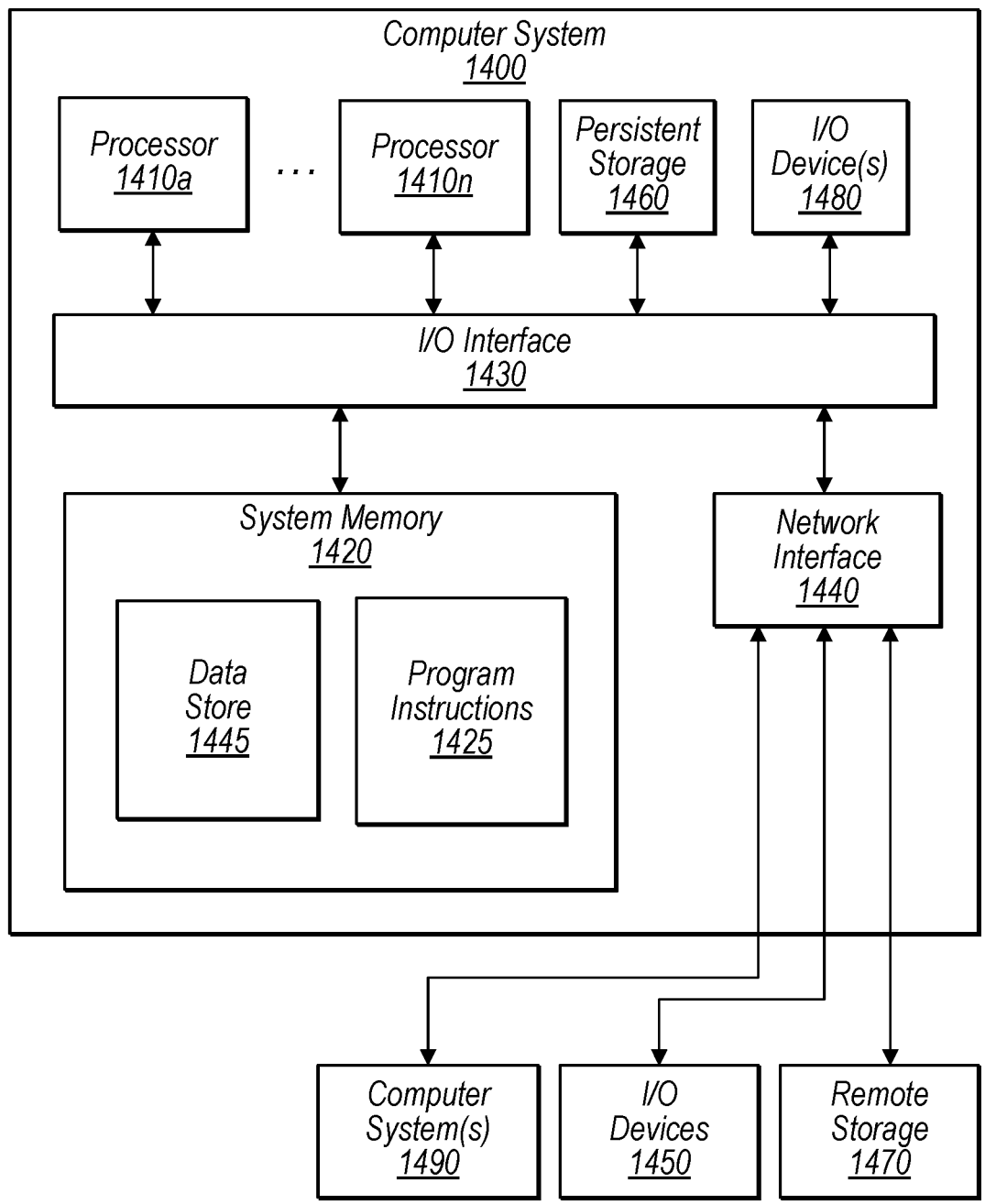
FIG. 14 is a block diagram illustrating an example computing system, according to some embodiments.

FIG. 14 is a block diagram illustrating an example computing system, according to some embodiments. For example, computer system 1400 may be configured to implement storage and/or compute nodes of a compute cluster, a data stores, and/or a client, in different embodiments. Computer system 1400 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1400 includes one or more processors 1410 (any of which may include multiple cores, which may be single or multi-threaded) coupled to a system memory 1420 via an input/output (I/O) interface 1430. Computer system 1400 further includes a network interface 1440 coupled to I/O interface 1430. In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA. The computer system 1400 also includes one or more network communication devices (e.g., network interface 1440) for communicating with other systems and/or components over a communications network (e.g. Internet, LAN, etc.).

In the illustrated embodiment, computer system 1400 also includes one or more persistent storage devices 1460 and/or one or more I/O devices 1480. In various embodiments, persistent storage devices 1460 may correspond to disk drives, tape drives, solid state memory, other mass storage devices, block-based storage devices, or any other persistent storage device. Computer system 1400 (or a distributed application or operating system operating thereon) may store instructions and/or data in persistent storage devices 1460, as desired, and may retrieve the stored instruction and/or data as needed. For example, in some embodiments, computer system 1400 may host a storage system server node, and persistent storage 1460 may include the SSDs attached to that server node.

Computer system 1400 includes one or more system memories 1420 that are configured to store instructions and data accessible by processor(s) 1410. In various embodiments, system memories 1420 may be implemented using any suitable memory technology, (e.g., one or more of cache, static random access memory (SRAM), DRAM, RDRAM, EDO RAM, DDR RAM, synchronous dynamic RAM (SDRAM), Rambus RAM, EEPROM, non-volatile/Flash-type memory, or any other type of memory). System memory 1420 may contain program instructions 1425 that are executable by processor(s) 1410 to implement the methods and techniques described herein. In various embodiments, program instructions 1425 may be encoded in platform native binary, any interpreted language such as Java™ byte-code, or in any other language such as C/C++, Java™, etc., or in any combination thereof. For example, in the illustrated embodiment, program instructions 1425 include program instructions executable to implement the functionality of a resource host, in different embodiments. In some embodiments, program instructions 1425 may implement multiple separate clients, nodes, and/or other components.

In some embodiments, program instructions 1425 may include instructions executable to implement an operating system (not shown), which may be any of various operating systems, such as UNIX, LINUX, Solaris™, MacOS™, Windows™, etc. Any or all of program instructions 1425 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1400 via I/O interface 1430. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1400 as system memory 1420 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1440.

In some embodiments, system memory 1420 may include data store 1445, which may be configured as described herein. In general, system memory 1420 (e.g., data store 1445 within system memory 1420), persistent storage 1460, and/or remote storage 1470 may store data blocks, replicas of data blocks, metadata associated with data blocks and/or their state, configuration information, and/or any other information usable in implementing the methods and techniques described herein.

In one embodiment, I/O interface 1430 may be configured to coordinate I/O traffic between processor 1410, system memory 1420 and any peripheral devices in the system, including through network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments, some or all of the functionality of I/O interface 1430, such as an interface to system memory 1420, may be incorporated directly into processor 1410.

Network interface 1440 may be configured to allow data to be exchanged between computer system 1400 and other devices attached to a network, such as other computer systems 1490, for example. In addition, network interface 1440 may be configured to allow communication between computer system 1400 and various I/O devices 1450 and/or remote storage 1470. Input/output devices 1450 may, in some embodiments, include one or more display terminals, keyboards, keypads, touchpads, scanning devices, voice or optical recognition devices, or any other devices suitable for entering or retrieving data by one or more computer systems 1400. Multiple input/output devices 1450 may be present in computer system 1400 or may be distributed on various nodes of a distributed system that includes computer system 1400. In some embodiments, similar input/output devices may be separate from computer system 1400 and may interact with one or more nodes of a distributed system that includes computer system 1400 through a wired or wireless connection, such as over network interface 1440. Network interface 1440 may commonly support one or more wireless networking protocols (e.g., Wi-Fi/IEEE 802.11, or another wireless networking standard). However, in various embodiments, network interface 1440 may support communication via any suitable wired or wireless general data networks, such as other types of Ethernet networks, for example. Additionally, network interface 1440 may support communication via telecommunications/telephony networks such as analog voice networks or digital fiber communications networks, via storage area networks such as Fibre Channel SANs, or via any other suitable type of network and/or protocol. In various embodiments, computer system 1400 may include more, fewer, or different components than those illustrated in FIG. 14 (e.g., displays, video cards, audio cards, peripheral devices, other network interfaces such as an ATM interface, an Ethernet interface, a Frame Relay interface, etc.).

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   a first set of resource hosts configured to implement a block-based storage service, wherein the block-based storage service is configured to provide storage volumes to clients of the block-based storage service; and
   a storage manager configured to:
      receive data indicating an access pattern for a given one of the storage volumes, wherein the access pattern indicates sectors of the given storage volume that are accessed during a launch process; and
      adaptively size, based on the access pattern, at least some snapshot chunks of a set of snapshot chunks of a snapshot for the storage volume, wherein at least some of the adaptively sized snapshot chunks of the set have different sizes than other ones of the snapshot chunks of the set.

2. The system of claim 1, wherein the storage manager is further configured to:
   generate a manifest indicating an order in which the snapshot chunks of the set are to be used to populate the given storage volume to perform the launch process.

3. The system of claim 1, wherein the storage manager is further configured to:
   perform one or more optimizations in response to determining the launch process using the storage volume has been performed more than a threshold number of times, the one or more optimizations comprising:
      the adaptively sizing of the at least some snapshot chunks of the set based on the access pattern; and
      generating a manifest indicating an order in which the snapshot chunks of the set are to be used to populate the given storage volume to perform the launch process.

4. The system of claim 1, wherein the storage manager is further configured to:
   implement an application programmatic interface (API) configured to receive an instruction to optimize the snapshot for use in performing the launch process; and
   perform, in response to receiving the instruction, one or more optimizations, comprising:
      the adaptively sizing of the at least some snapshot chunks of the set based on the access pattern; and
      generating a manifest indicating an order in which the snapshot chunks of the set are to be used to populate the given storage volume to perform the launch process.

5. The system of claim 1, further comprising:
   a cloud provider network; and
   a second set of resource hosts configured to implement an object-based storage service, wherein the object-based storage service is configured to store at least some of the snapshot chunks usable to populate the storage volume in the block-based storage service,
   wherein the first set of resource hosts configured to implement the block-based storage service and the second set of resource hosts configured to implement the object-based storage service are included in the cloud provider network.

6. The system of claim 1, further comprising:
   an additional set of resource hosts configured to implement a cache storage service configured to store at least some of the snapshot chunks usable to populate the storage volume in the block-based storage service,
   wherein the additional set of hosts configured to implement the cache storage service is included in the cloud provider network.

7. One or more non-transitory computer-readable media storing program instructions that, when executed on or across one or more processors, cause the one or more processors to:
   receive a request to populate a volume in a block-based storage service using a snapshot;
   populate the volume using a set of snapshot chunks of the snapshot, wherein the snapshot chunks comprise at least some adaptively sized snapshot chunks having different sizes than other ones of the snapshot chunks of the set of snapshot chunks.

8. The one or more non-transitory computer-readable media of claim 7, wherein to populate the volume, the program instructions, when executed on or across one or more processors, cause the one or more processors to:
   populate respective ones of the snapshot chunks of the set according to an order indicated in a manifest, wherein the manifest indicates an order in which the snapshot chunks of the set are to be used to populate the volume to perform a launch process using the volume.

9. The one or more non-transitory computer-readable media of claim 7, wherein the program instructions, when executed on or across the one or more processors, cause the one or more processors to:
   map the snapshot chunks of the set, including the adaptively sized snapshot chunks, to volume blocks of the volume.

10. The one or more non-transitory computer-readable media of claim 7, wherein the snapshot comprises a machine image for use in booting a machine instance.

11. The one or more non-transitory computer-readable media of claim 10, wherein:
- a snapshot chunk size or sizes of one or more snapshot chunks of the set are sized to correspond to a size or sizes of portions of the machine image that are customized to a particular machine instance when using the machine image as a launch volume; and
- a snapshot chunk size or sizes of one or more other snapshot chunks of the set are sized to correspond to a size or sizes of other portions of the machine image that are common portions of the launch volume used by a plurality of machine instances when using the machine image as the launch volume.

12. The one or more non-transitory computer-readable media of claim 11, wherein the program instructions, when executed on or across the one or more processors, cause the one or more processors to:
- store the snapshot chunks sized to correspond to a size or sizes of other portions of the machine image that are common portions of the launch volume used by a plurality of machine instances in a cache.

13. The one or more non-transitory computer-readable media of claim 12, wherein the program instructions, when executed on or across the one or more processors, cause the one or more processors to:
- boot another machine instance using a cold boot volume;
- generate a warm boot volume comprising the snapshot chunks customized to the particular machine instance when using the machine image as the boot volume, wherein the snapshot chunks of the warm boot volume comprise customized data generated by the machine instance booted using the cold boot volume; and
- boot the particular machine instance using snapshot chunks stored in the cache that are common boot volume portions and using warm boot snapshot chunks stored in another storage service other than the cache.

14. The one or more non-transitory computer-readable media of claim 7, wherein the snapshot comprises a snapshot of an application, a database, or a cold boot volume.

15. A method, comprising:
- receiving a request to populate a volume in a block-based storage service using a snapshot;
- populating the volume using a set of snapshot chunks of the snapshot, wherein the snapshot chunks comprise at least some adaptively sized snapshot chunks having different sizes than other ones of the snapshot chunks of the set of snapshot chunks.

16. The method of claim 15, wherein said populating the volume is performed in according to an order indicated in a manifest, wherein the manifest indicates an order in which the snapshot chunks of the set are to be used to populate the volume to perform a launch process using the volume.

17. The method of claim 16, wherein the manifest is an optimized manifest, the method further comprising:
- determining, in response to receiving the request to populate the volume, whether an optimized manifest is stored for the volume; and
- if an optimized manifest is stored for the volume, populating the volume according to the optimized manifest using the set of snapshot chunks that comprise the at least some adaptively sized snapshot chunks; and
- if an optimized manifest is not stored for the volume, populating the volume using a set of standard sized snapshot chunks.

18. The method of claim 15, wherein the snapshot comprises a machine image for use in booting a virtual machine, the method further comprising:
- attaching the volume to the virtual machine; and
- booting the virtual machine using the machine image of a populated version of the volume.

19. The method of claim 18, wherein:
- one or more of the snapshot chunks of the set are stored in the cache and comprise larger snapshot chunks comprising portions of the machine image that are common for use in launching a plurality of virtual machines; and
- one or more other snapshot chunks of the set are stored in another storage and comprise smaller snapshot chunks comprising portions of the machine image comprising volume data specific to a particular virtual machine or client.

20. The method of claim 19, further comprising:
- booting another virtual machine using a cold boot volume;
- generating a warm boot volume comprising the snapshot chunks customized to the particular machine instance when using the machine image as the boot volume, wherein the snapshot chunks of the warm boot volume comprise customized data generated by the machine instance booted using the cold boot volume; and
- booting the particular machine instance using snapshot chunks stored in the cache that are common boot volume portions and using warm boot snapshot chunks stored in another storage service other than the cache.

* * * * *